(12) United States Patent
Wan

(10) Patent No.: US 12,484,929 B2
(45) Date of Patent: Dec. 2, 2025

(54) IMAGING NEEDLE GUIDE

(71) Applicant: Shaw P. Wan, Norwood, NC (US)

(72) Inventor: Shaw P. Wan, Norwood, NC (US)

( * ) Notice: Subject to any disclaimer, the term of this patent is extended or adjusted under 35 U.S.C. 154(b) by 339 days.

(21) Appl. No.: 17/743,810

(22) Filed: May 13, 2022

(65) Prior Publication Data

US 2022/0346831 A1    Nov. 3, 2022

Related U.S. Application Data

(63) Continuation-in-part of application No. 17/212,455, filed on Mar. 25, 2021, now abandoned.

(51) Int. Cl.
| | |
|---|---|
| *A61B 17/34* | (2006.01) |
| *A61B 90/00* | (2016.01) |
| *A61B 90/10* | (2016.01) |
| *A61B 90/11* | (2016.01) |

(52) U.S. Cl.
CPC .......... *A61B 17/3403* (2013.01); *A61B 90/10* (2016.02); *A61B 90/11* (2016.02); *A61B 90/39* (2016.02); *A61B 2017/3407* (2013.01); *A61B 2090/061* (2016.02); *A61B 2090/0807* (2016.02)

(58) Field of Classification Search
CPC ..... A61B 17/3403; A61B 90/10; A61B 90/11; A61B 90/39; A61B 2090/101; A61B 2090/061; A61B 2017/3407; A61B 2017/3409
See application file for complete search history.

(56) References Cited

U.S. PATENT DOCUMENTS

| | | | | |
|---|---|---|---|---|
| 11,583,362 | B2* | 2/2023 | Chu | A61B 17/3403 |
| 2004/0122446 | A1* | 6/2004 | Solar | A61B 90/11 |
| | | | | 606/129 |
| 2006/0229641 | A1* | 10/2006 | Gupta | A61B 17/3403 |
| | | | | 606/130 |
| 2011/0118541 | A1* | 5/2011 | Gassmann | A61B 90/11 |
| | | | | 600/102 |
| 2017/0086813 | A1* | 3/2017 | Hess | A61B 17/3462 |
| 2018/0338812 | A1* | 11/2018 | Morey | A61B 17/3403 |

* cited by examiner

*Primary Examiner* — Shaun L David
*Assistant Examiner* — Rachael L Geiger
(74) *Attorney, Agent, or Firm* — Blake E. Vande Garde; AVEK IP, LLC

(57) ABSTRACT

A needle guide comprising a base to which a pair of horizontal slide bars are secured, the horizontal slide bars including a channel opening running between the bars, a needle stabilizer with a central tube is slideably engaged with the pair of horizontal slide bars, wherein the needle stabilizer extends through the channel opening and has the ability to change positions along a length of the horizontal slide bar, an angular ruler is secured to the base and located proximal to the needle stabilizer to allow accurate adjustment of the angle of the externally adjustable needle guide and one or more virtual visualization bars to aid in visualization using radiography, ultrasound, or magnetic resonance (or any other medical imaging technology) to visualize the virtual visualization bars.

13 Claims, 27 Drawing Sheets

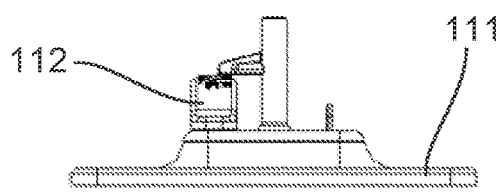
FIG. 33B
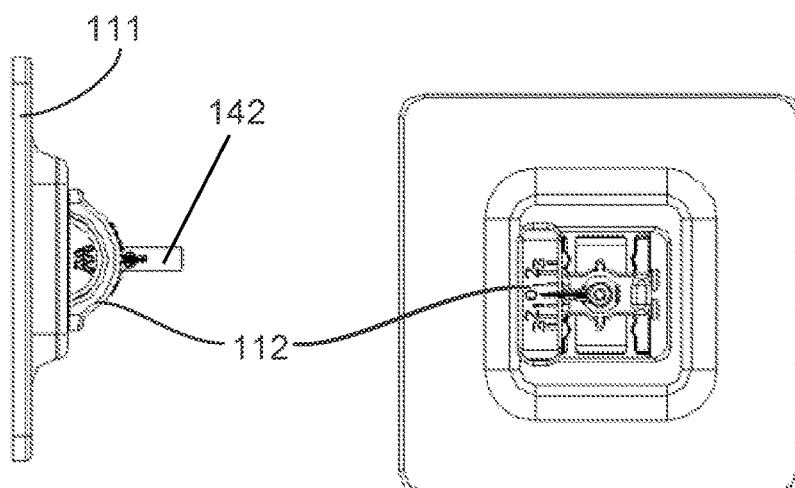
FIG. 33E  FIG. 33A
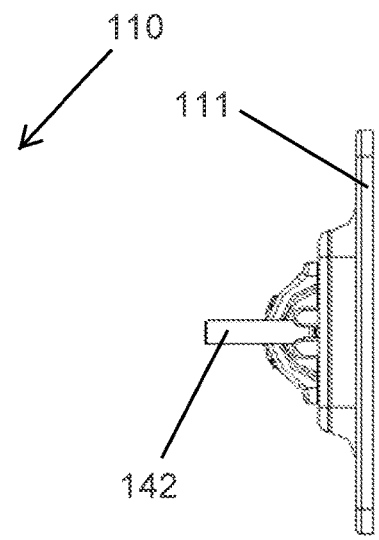
FIG. 33C
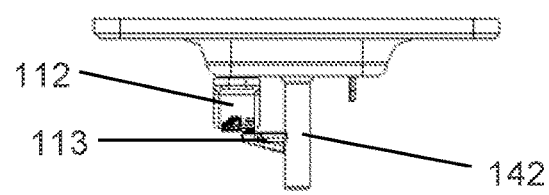
FIG. 33D
FIG. 33

IMAGING NEEDLE GUIDE

RELATED CASES

This is a continuation-in-part application of U.S. patent application Ser. No. 17/212,455 filed on Mar. 25, 2021. The full disclosure of this application is expressly incorporated herein by reference.

FIELD OF INVENTION

The instant invention relates to a system and method for identifying a needle insertion location, and more specifically, for automatically providing a visual indication of the needle insertion location during a procedure performed in coordination with a medical diagnostic image, such as a radiographic, ultrasonographic, and/or magnetic resonance imaging (MRI) image.

BACKGROUND OF THE INVENTION

The trend for surgical advancement has been and continues to be miniaturization. This type of minimally invasive surgery is an innovative technique of modern surgery. Miniaturized minimally invasive surgery generally requires placement of needle into the area that needs to be treated. Treatment energy, such as radiofrequency, cryotherapy, or radioactive implants can be delivered through the needle. Alternatively, a guide wire can be inserted through the needle followed by dilation. The dilation tract can then accommodate larger instrument such as endoscope to perform the planned surgery. The key for any miniaturized minimally invasive procedure is the accurate placement of the puncture needle.

The percutaneous approach, such as percutaneous biopsy, percutaneous nephrolithotomy, and percutaneous tissue ablation, are rapidly evolving and recognized minimally invasive surgeries. The key step of the percutaneous procedure is the accurate placement of the introductory needle through which further surgical intervention can be instituted. The introductory needle is generally placed under imaging guidance, currently the imaging modalities frequently used to include but not limited to radiographic, ultrasonic, computed tomography (CT), and magnetic resonance (MR) images. Currently, the two most popular techniques used in radiographic guidance are the bull's eye technique and the triangulation technique. Each of these techniques have their short comings and a long learning curve. Ultrasonic and MR techniques also have issues with precise placement of the needle. Currently there is a lack of a simple and cost-effective guide for the needle placement. The instant invention aims to provide such a device by simplifying the bull's eye technique and shortening its learning curve to improve the accuracy of needle placement.

Hence there is a need for improved needle guides and techniques to aid in the placement of needles during medical procedures.

SUMMARY OF THE INVENTION

The instant invention is comprised of radiographic grids and an adjustable needle guide to facilitate the placement of an introductory needle using a two-dimensional aiming technique. The instant invention utilizes one or two overlie radiographic grids in the forms of aiming rings to better target the introductory needle. The path of the needle can be further adjusted through an adjustable needle guide. The adjustable needle guide is further divided into an externally adjustable and an internally adjustable guide for use in all imaging modalities.

DESCRIPTION OF THE DRAWINGS

FIG. 33 includes multiple views of a needle guide of one embodiment of the present invention.

FIG. 33A is a top view of a needle guide of one embodiment of the present invention.

FIG. 33B is a side view of a needle guide of one embodiment of the present invention.

FIG. 33C is a rear view of a needle guide of one embodiment of the present invention.

FIG. 33D is a side view of a needle guide of one embodiment of the present invention.

FIG. 33E is a front view of a needle guide of one embodiment of the present invention.

DETAILED DESCRIPTION

Figure 1:
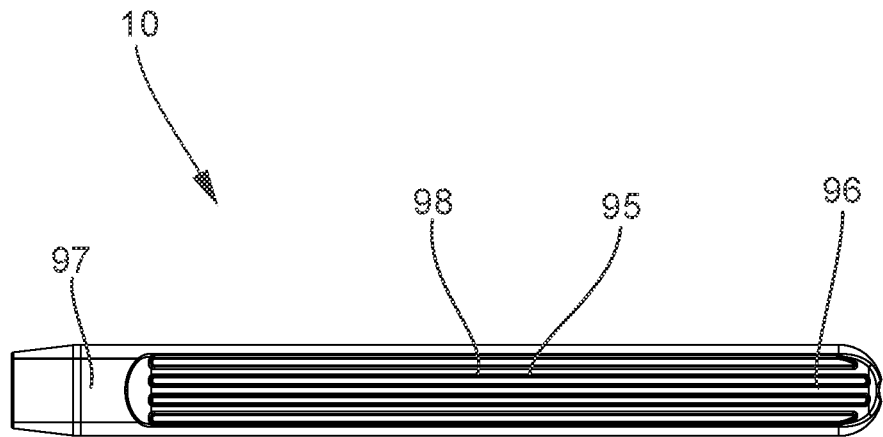
FIG. 1 is a top view of one embodiment of an imaging needle guide of the present invention.
Figure 1:
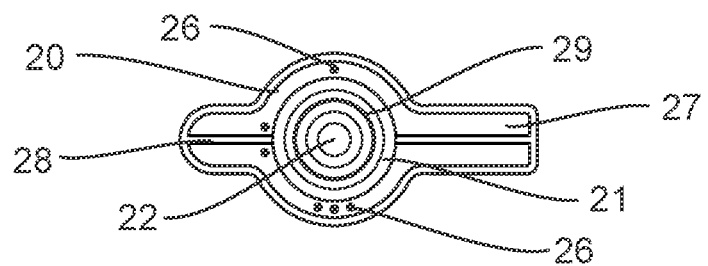
Figure 1:
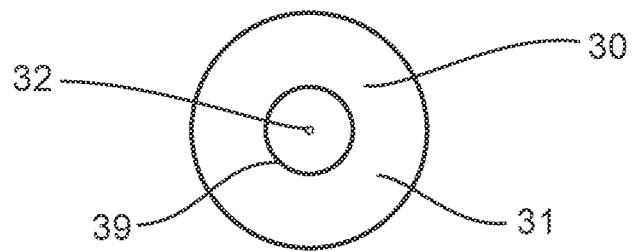

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The imaging needle guide 20 of the instant invention includes the use of radiographic grids 20, 30, 50, 60, 80 to facilitate the placement of an introductory needle using the two-dimensional aiming technique. The guide 20 uses two overlying radiographic grids (i.e., proximal grid 20 and distal grid 30) configured as aiming rings to aid in targeting and placing the introductory needle. The path of the needle can be further adjusted through an adjustable needle guide. The adjustable needle guide is further divided into internally adjustable guide 50 and externally adjustable guide 60 for use in all imaging modalities such as radiography, ultrasonic, computed tomography (CT), magnetic resonance imaging (MRI), nuclear medicine, and the like.

Figure 2:
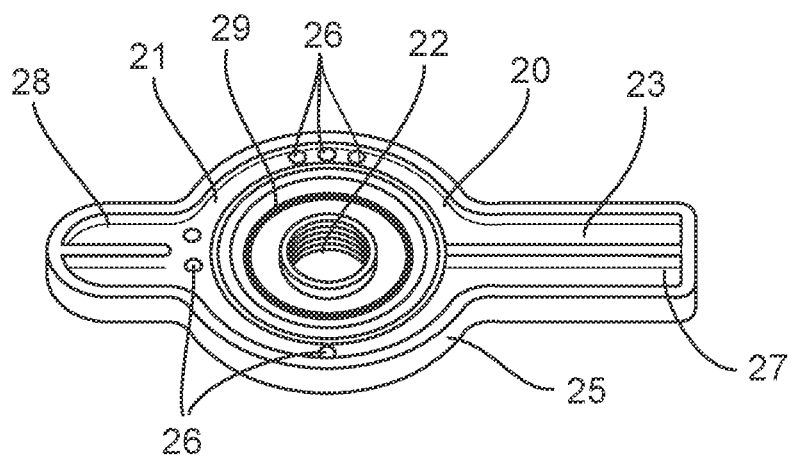
FIG. 2 is a top proximal view of a proximal grid of one embodiment of the present invention.
Figure 3:
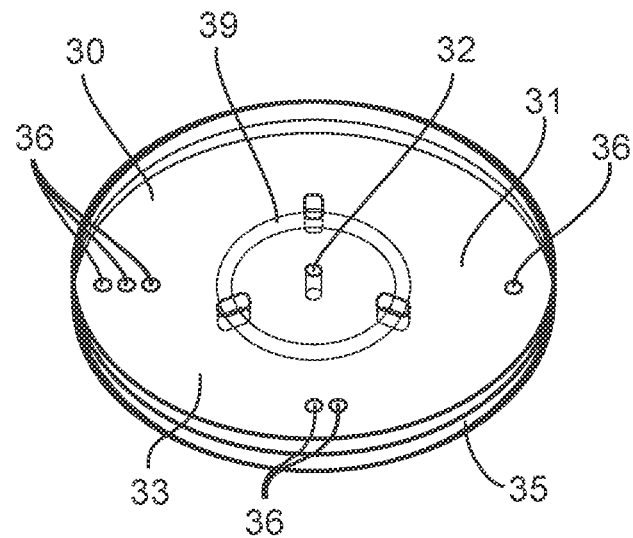
FIG. 3 is a top proximal view of a distal grid of one embodiment of the present invention.
Figure 4:
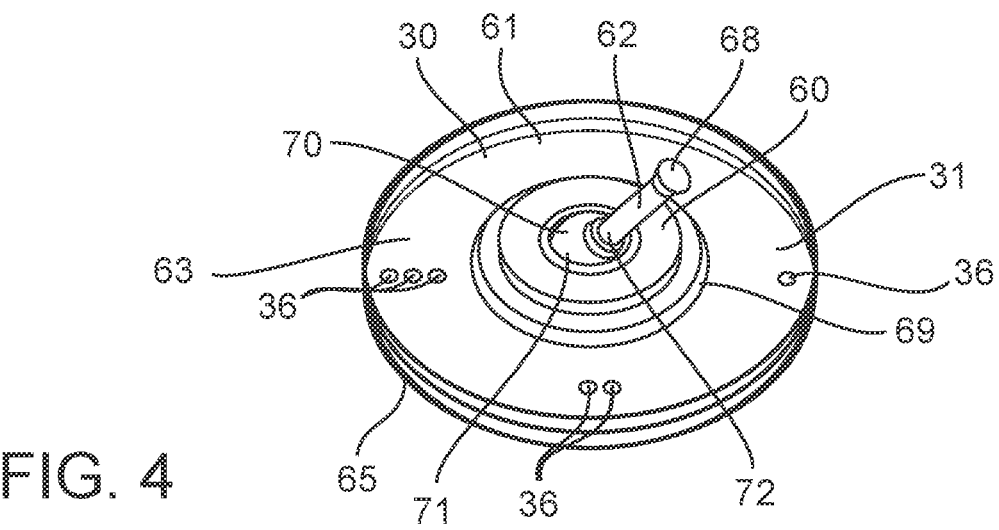
FIG. 4 is a top proximal view of an externally adjustable needle guide of one embodiment of the present invention.
Figure 5:
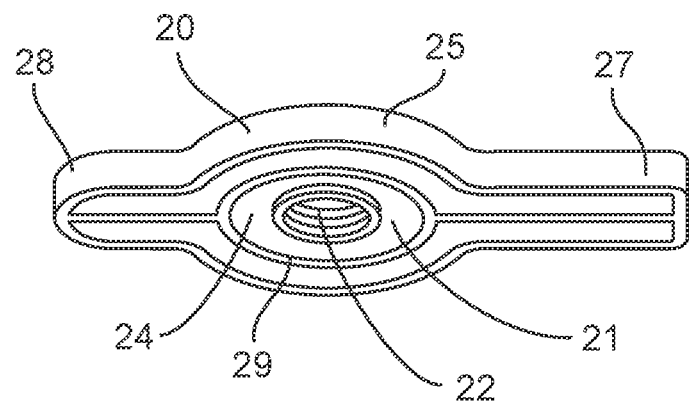
FIG. 5 is a bottom proximal view of a proximal grid of one embodiment of the present invention.
Figure 6:
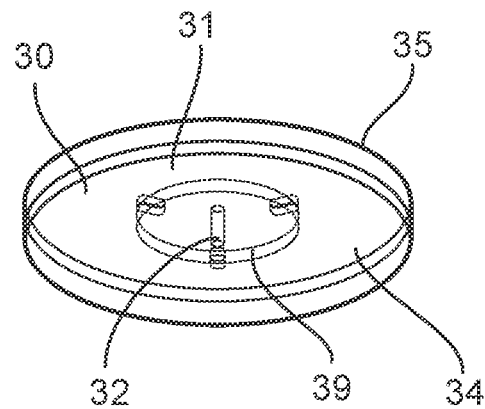
FIG. 6 is a bottom proximal view of a distal grid of one embodiment of the present invention.
Figure 7:
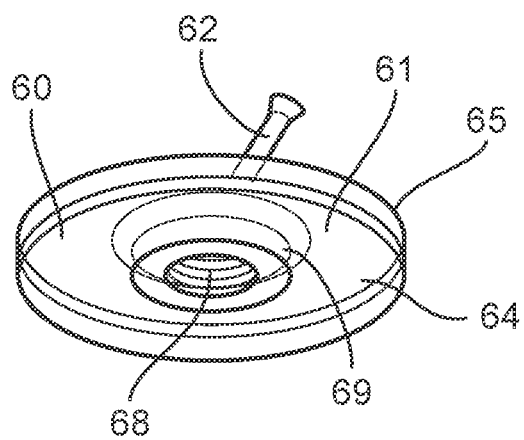
FIG. 7 is a bottom proximal view of an externally adjustable needle guide of one embodiment of the present invention.
Figure 8:
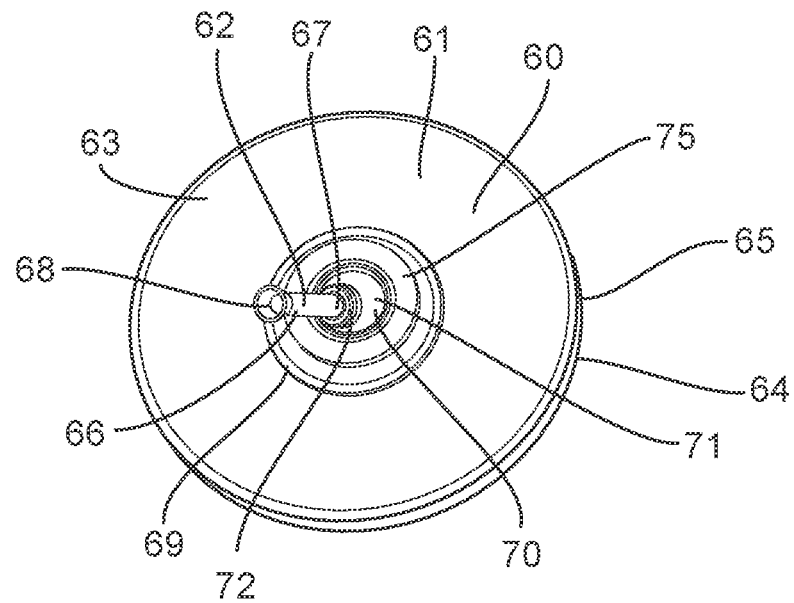
FIG. 8 is a top view of an externally adjustable needle guide of one embodiment of the present invention.
Figure 10:
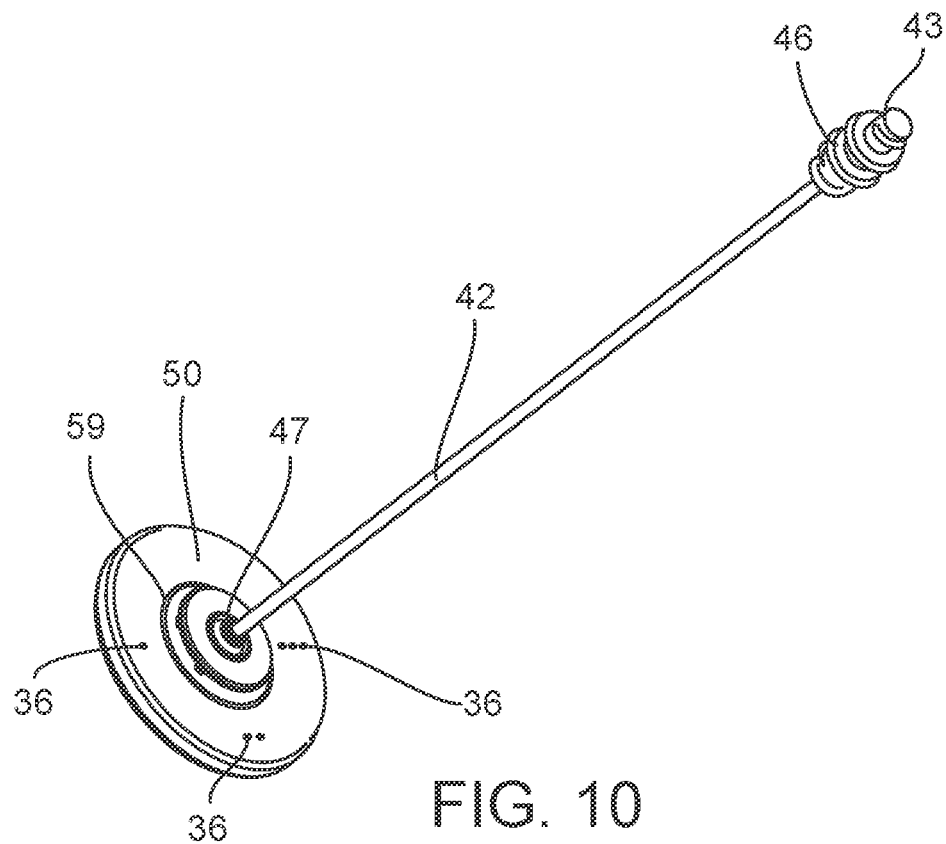
FIG. 10 is a proximal view of an internally adjustable needle guide of one embodiment of the present invention.

The instant invention includes an imaging needle guide 10 comprising a proximal grid 20 including a body 21, a top side 23, a bottom side 24, one or more radiopaque rings 29, and a central aperture 22 extending through the body 21 from the top side 23 to the bottom side 24. The imaging needle guide 10 includes a distal grid 30 including a body 31, a top side 33, a bottom side 34, one or more radiopaque rings 39, and a central aperture 32 extending through the body 31 from the top side 33 to the bottom side 34 and a needle. The distal grid 30 can include direction markers 36 as shown in FIGS. 3, 4 and 10. The proximal grid 20 can include direction markers 26 as shown in FIGS. 1 and 2. The direction markers 26 aid the user in ascertaining the orientation of the proximal grid during medical imaging (i.e., fluoroscopic radiography). The markers 26 can be any shapes or recognizable characters such as dots or numbers. In some embodiments, the proximal grid 20 can include a proximal arm 27, a distal arm 28, or both.

The main body of the proximal grid 20 and distal grid 30 are constructed with a material which is flexible, semi-flexible, rigid or a combination thereof. The preferred embodiment of the distal grid 30 is made of soft rubber whereas the preferred embodiment of the proximal grid 20 is made of rigid plastic. Each grid may be of any shape or size. The preferred embodiment is round. In one embodiment, the distal grid 30 has a diameter of 1.5, 2, 3, 4, 5, 6, or 7 centimeters and the proximal grid 20 has a diameter of 1.5, 2, 3, 4, 5, 6, or 7 centimeters. As stated previously, both grids 20, 30 have a centrally placed radiopaque rings 29, 39. The rings can be of any size but are necessarily the same or smaller than the main body of the grid. In one embodiment, the central aiming ring is 1, 1.5, 2, 2.5, 3, 3.5, 4, 4.5 or 5 centimeters in diameter.

Looking to the figures, several embodiments of an imaging needle guide 10 and its various components are illustrated. FIG. 1 illustrates a proximal grid 20, a distal grid 30, and a handle 95. The proximal grid 20 includes a body 21, a top side 23, a bottom side 24, an edge 25 around the perimeter of the device, a plurality of direction markers 26 (optional), one or more radiopaque rings 29, a distal arm 28 emanating from the body 21, and a proximal arm 27 emanating from the body 21, and a central aperture 22 extending through the body 21 from the top side 23 to the bottom side 24. The distal grid 30 includes a body 31, a top side 33, a bottom side 34, an edge 35 around the perimeter of the device, one or more radiopaque rings 39, and a central aperture 32 extending through the body 31 from the top side 33 to the bottom side 34. The handle 95 is operatively associated with the proximal grid 20 to aid in maintaining the location of the proximal grid and aiming the proximal grid. The handle 95 includes a proximal end 96, a distal end 97, and a body 98. The handle 95 can engage with either the proximal arm 27 or the distal arm 28 or both with a second handle to aid in the placement of the proximal grid 20. The handle body 98 is a long shaft that is sufficiently long enough to allow the hand that is holding the handle to be outside of radiation field to minimize the radiation exposure to the hand. The handle 95 may be reversibly or non-reversibly attached to the proximal grid 20. The preferred embodiment is reversibly attached through a push in/pull out male to female connection. The male ends are the proximal arm 27 and distal arm 28 on the proximal grid. The female end is a hollow receptacle at one end of the handle that would fit the side arm snuggly. Alternatively, a clamp may be used in place of or in conjunction with a handle 95 to aid in manipulation, placement and maintaining the position of the proximal grid 20. The needle used in the instant invention can be any needle known in the art. The needle used will generally be longer than the internally adjustable needle guide 50, the externally adjustable needle guide 60 and the needle stabilizer 140. The needle can be 1, 2, 3, 4, 5, 6, 7, 8, 9, 10 or more centimeters longer than the central tubes 42, 62, 142 of the needle guides.

In one embodiment of the instant invention, an imaging needle guide 10 includes a hollow axle (similar to 42) engaged to the distal grid 30 at one end and slideably engaged to the proximal grid 20 at the opposite end, wherein the proximal grid 20 can slide along the axle and the hollow axle become an internal needle guide.

Figure 9:
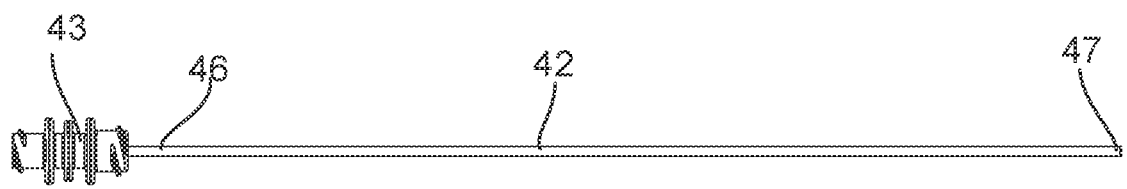
FIG. 9 is a side view of a central tube of an internally adjustable needle guide of one embodiment of the present invention.
Figure 11:
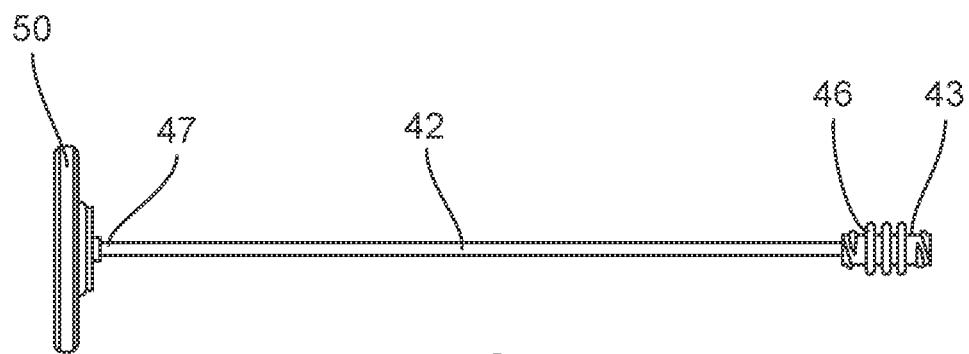
FIG. 11 is a side view of an internally adjustable needle guide of one embodiment of the present invention.
Figure 12:
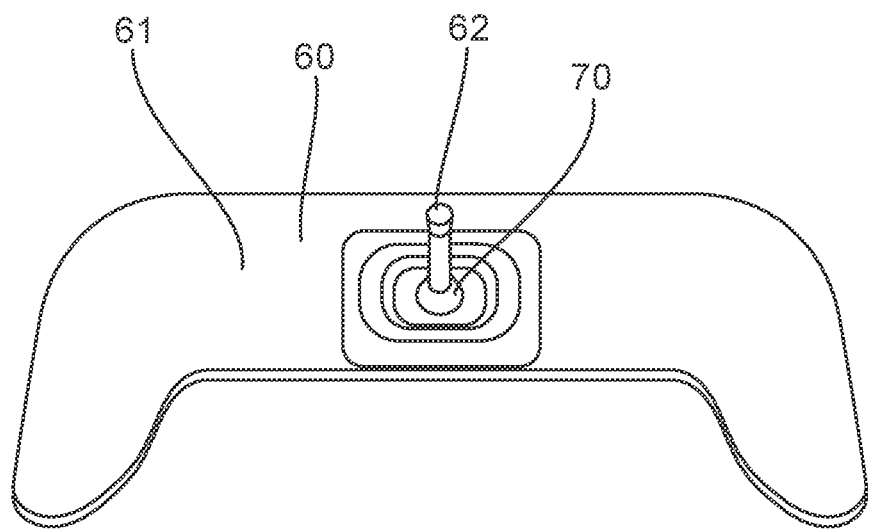
FIG. 12 is a proximal view of an externally adjustable needle guide of one embodiment of the present invention.
Figure 13:
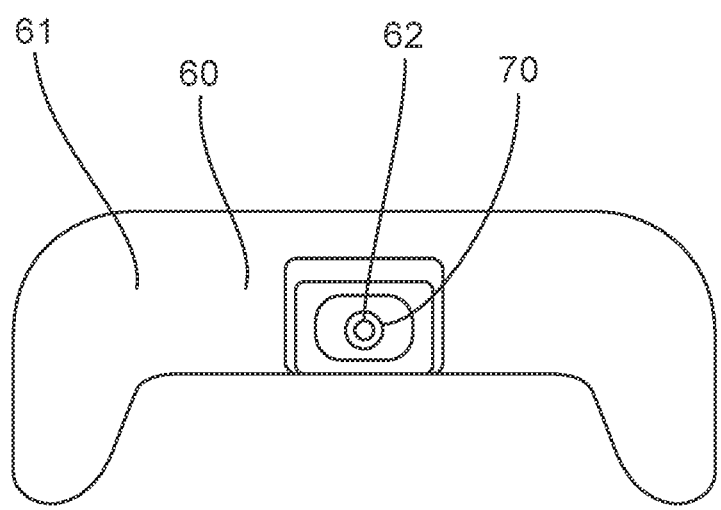
FIG. 13 is a bottom view of an externally adjustable needle guide of one embodiment of the present invention.
Figure 14:
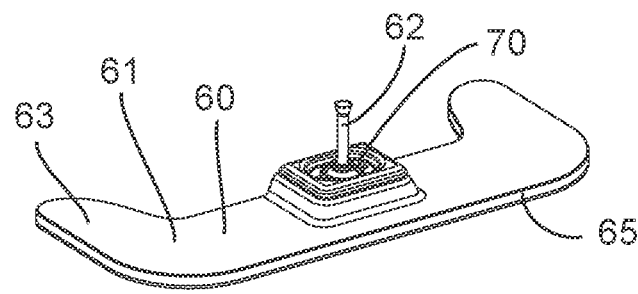
FIG. 14 is a proximal view of an externally adjustable needle guide of one embodiment of the present invention.
Figure 15:
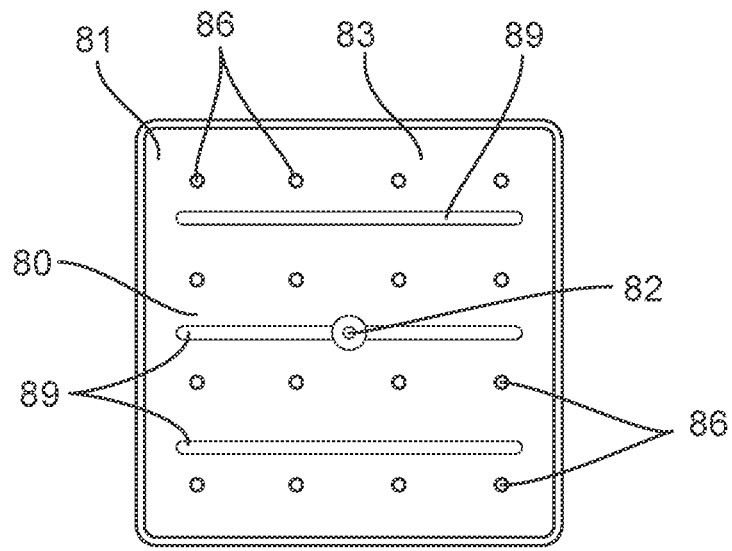
FIG. 15 is a top view of a horizontal grid of one embodiment of the present invention.
Figure 16:
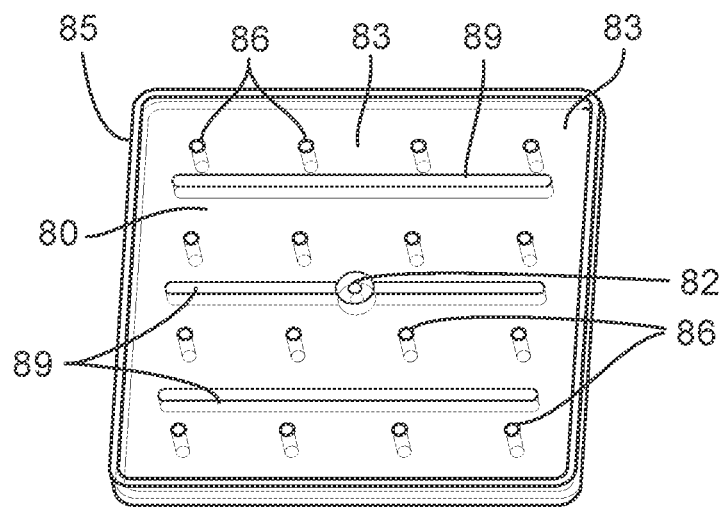
FIG. 16 is a proximal view of a horizontal grid of one embodiment of the present invention.
Figure 17:
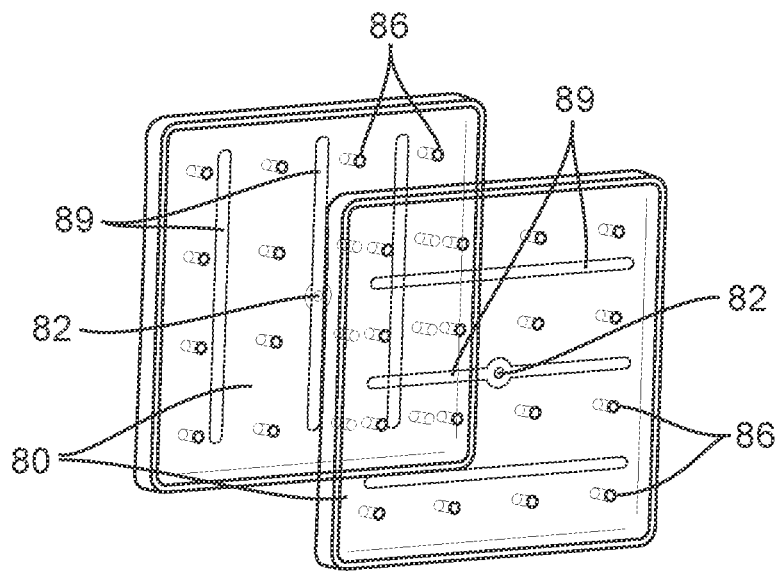
FIG. 17 is a proximal view of a pair of horizontal grids of one embodiment of the present invention.
Figure 18:
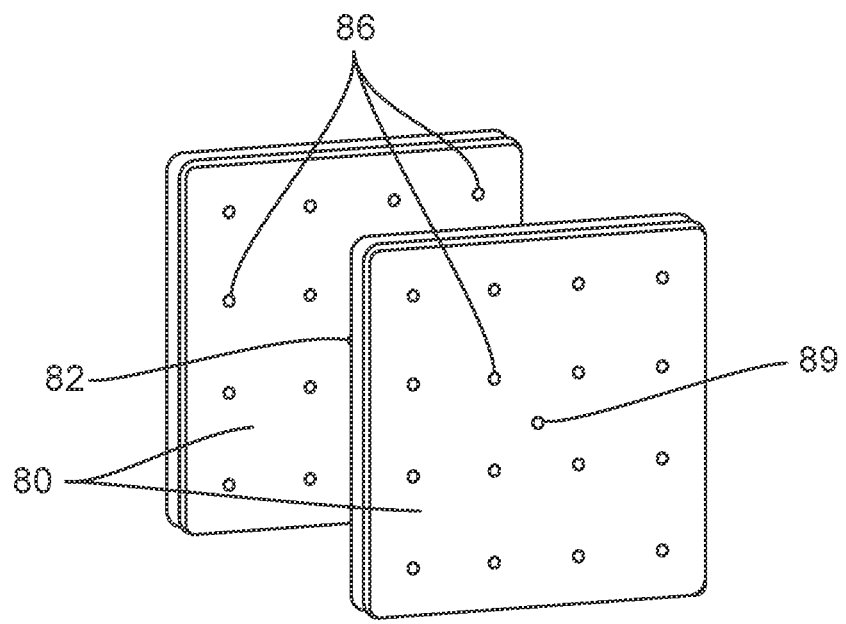
FIG. 18 is a proximal view of a pair of horizontal grids of one embodiment of the present invention.
Figure 19:
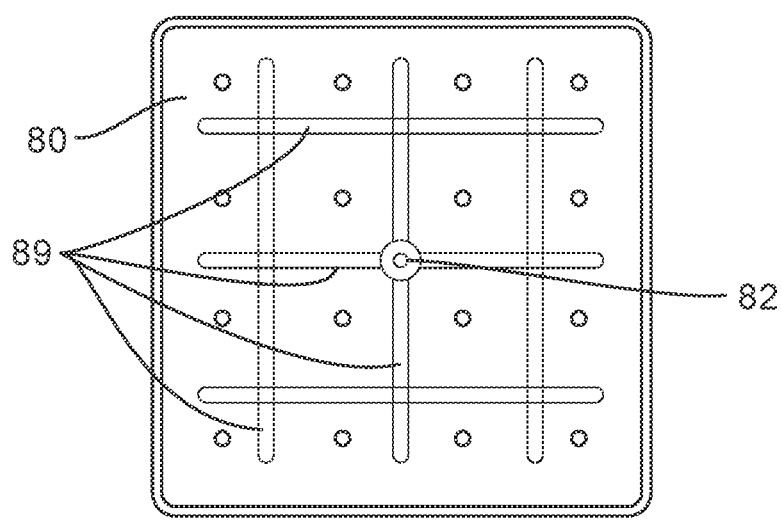
FIG. 19 is a top view of a pair of horizontal grids of one embodiment of the present invention.
Figure 20:
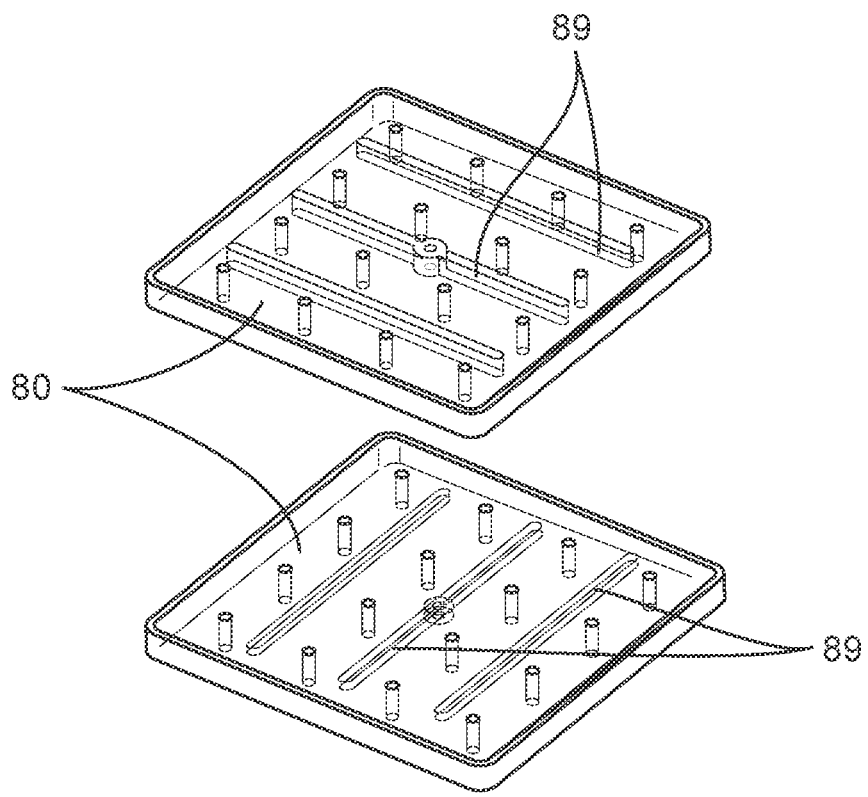
FIG. 20 is a proximal view of a pair of horizontal grids of one embodiment of the present invention.
Figure 21:
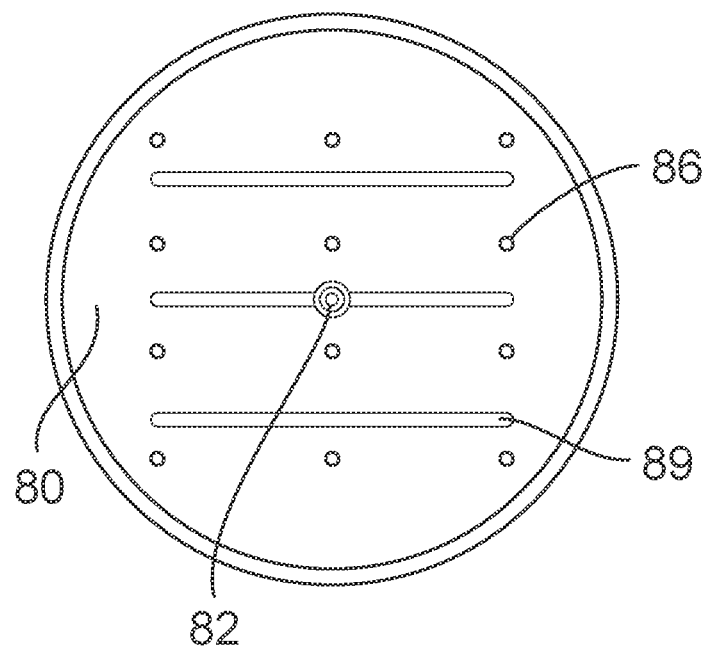
FIG. 21 is a top view of a horizontal grid of one embodiment of the present invention.
Figure 22:
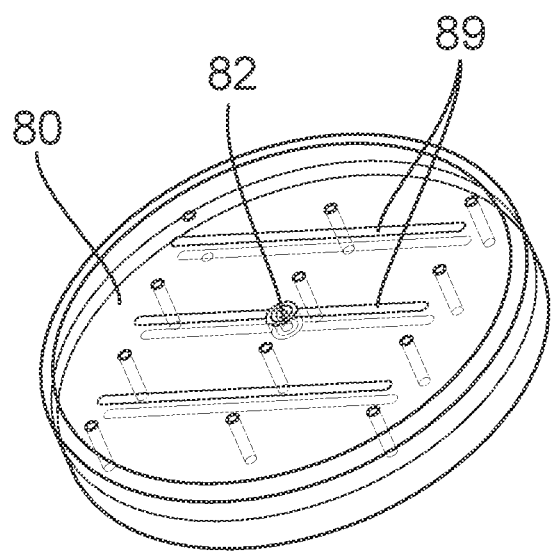
FIG. 22 is a proximal view of a horizontal grid of one embodiment of the present invention.
Figure 23:
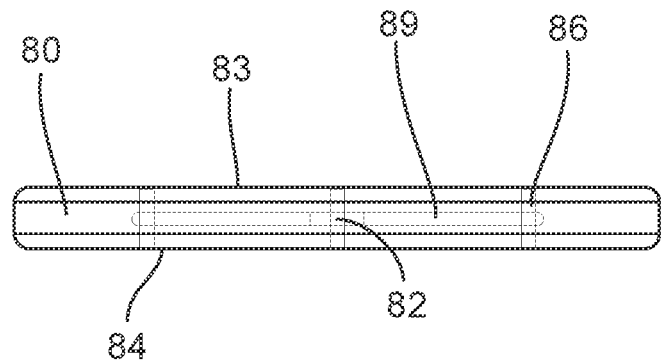
FIG. 23 is a side view of a horizontal grid of one embodiment of the present invention.
Figure 24:
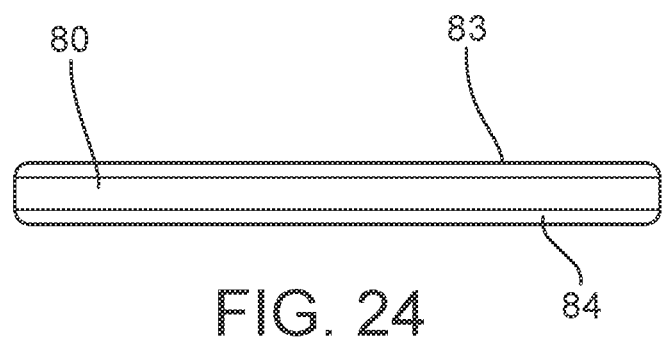
FIG. 24 is a side view of a horizontal grid of one embodiment of the present invention.
Figure 25:
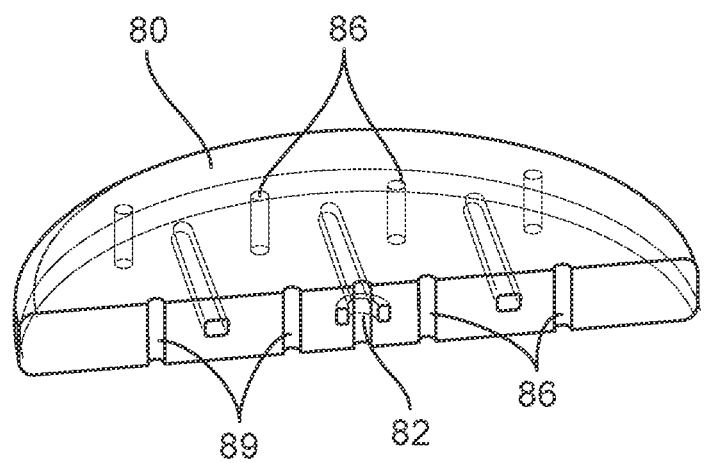
FIG. 25 is a cut through view of a horizontal grid of one embodiment of the present invention.
Figure 26:
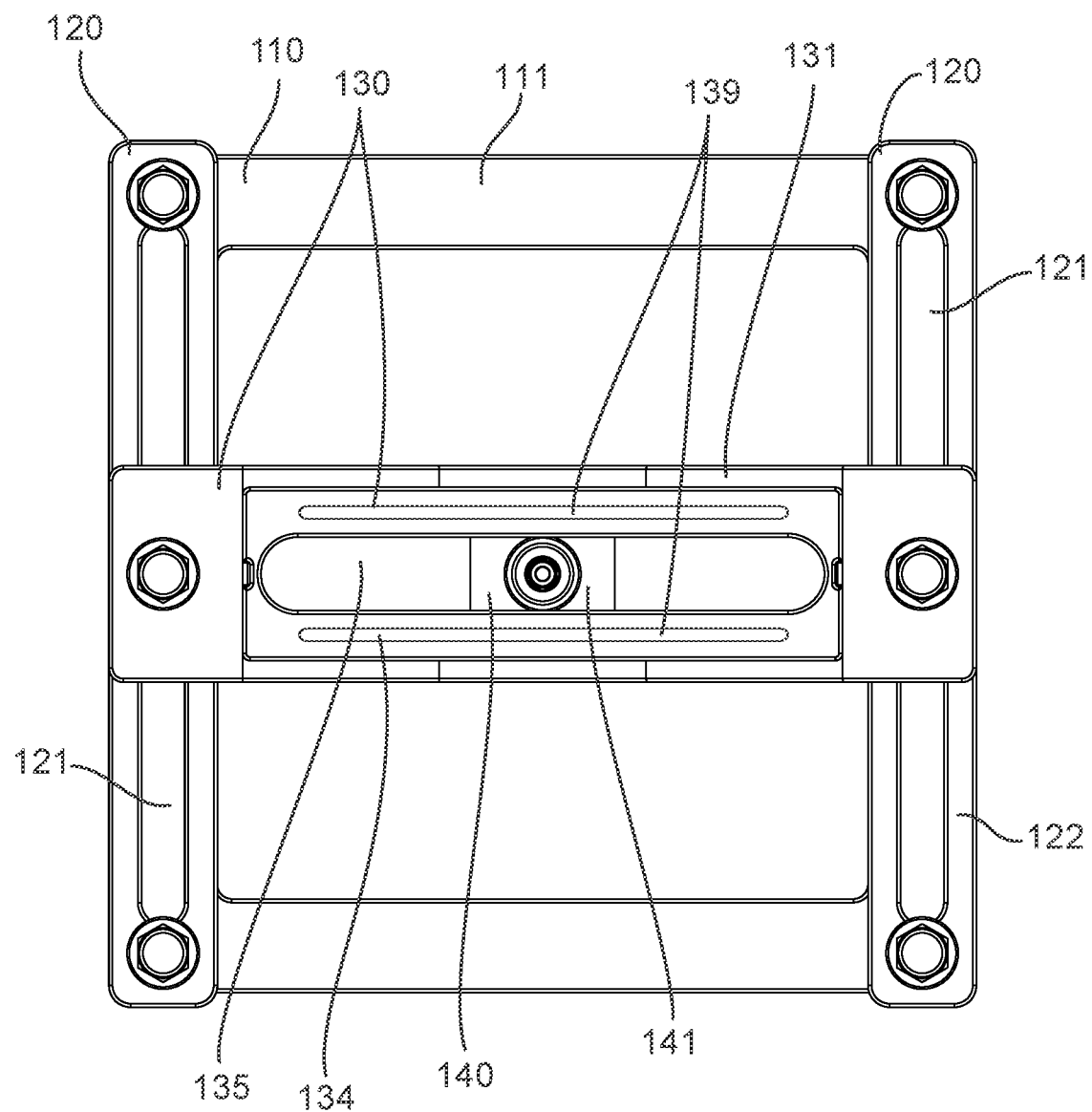
FIG. 26 is a top view of a needle guide of one embodiment of the present invention.
Figure 27:
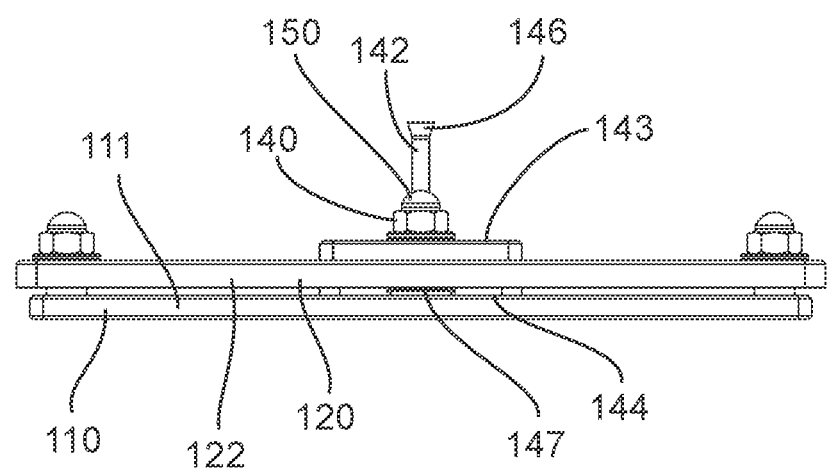
FIG. 27 is a side view of a needle guide of one embodiment of the present invention.
Figure 28:
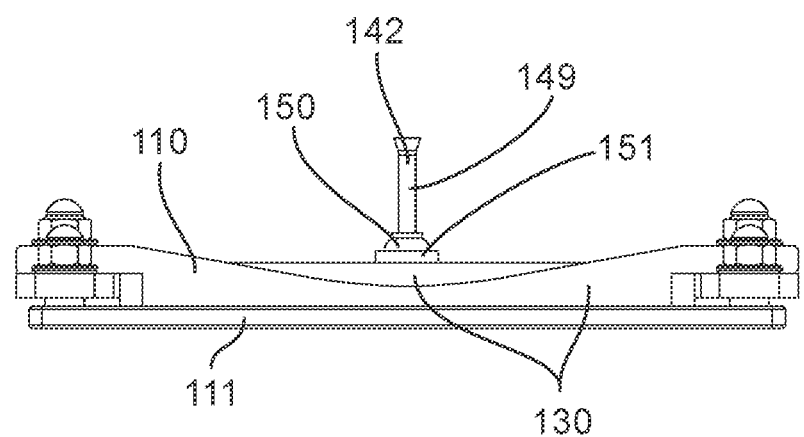
FIG. 28 is a side view of a needle guide of one embodiment of the present invention.
Figure 29:
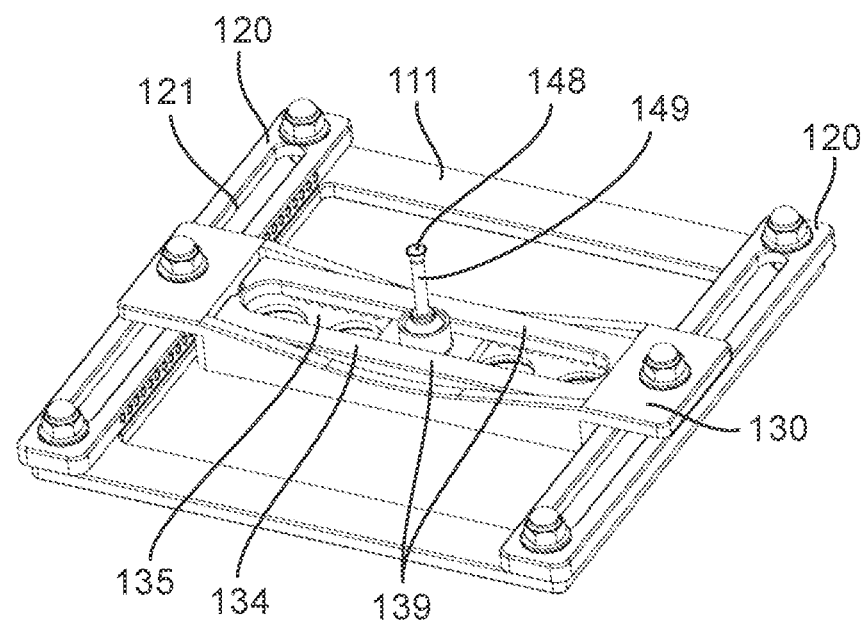
FIG. 29 is a proximal view of a needle guide of one embodiment of the present invention.

In one embodiment of the instant invention, an imaging needle guide 10 includes an internally adjustable needle guide 50 (FIGS. 9-11) operatively associated with the distal grid 30, which includes a body 51 secured to the distal grid 30, a central tube 42 secured to the body 51 and passing through the central aperture 32 where the central tube 42 is designed to be inserted into a patient with the puncture needle at a desired position to aid in directing the needle into a patient. The body 51 of the internally adjustable needle guide 50 includes a top side 53, a bottom side 54, one or more radiopaque rings 59, and an edge 55 around the perimeter of the body. The central tube 42 has a proximal end 46, a distal end 47 and a lumen 48 through which objects and/or a needle may be passed. The central tube 42 also includes a hub 43 at its proximal end 46. The hub can be a double lure lock connector which allows for the end at the distal direction to connect to a proximal grid 20 and the end at the proximal direction to connect to the puncture needle. The central tube 42 is necessarily shorter than the needle. In the preferred embodiment, the central tube 42 is two centimeters shorter than the needle. The distal end 47 of the central tube 42 (opposite to the operator holding the guide 50) is tapered and thus ensures the transition between the needle shaft and the central tube 42 should be smooth without a step-off. The internally adjustable needle guide 50 may be used in conjunction with the proximal grid 20 or as a stand-alone device.

In one embodiment of the instant invention, an imaging needle guide 10 includes an externally adjustable needle guide 60 (FIGS. 4, 7, 8, and 12-14) operatively associated with the distal grid 30, which includes a body 61 secured to the distal grid 30, a ball bearing 70 with a central aperture 72, a central tube 62 secured to the ball bearing 70 and passing through the central aperture 32, 72 where the ball bearing 70 allows the central tube 62 to be adjusted to a desired position to aid in directing the needle into a patient. The body 61 of the externally adjustable needle guide 60 includes a top side 63, a bottom side 64, one or more radiopaque rings 69, and an edge 65 around the perimeter of the body. The central tube 62 has a proximal end 66, a distal end 67, and a lumen 68 through which objects and/or a needle may be passed. The externally adjustable grid can also include a stabilizer 60 operationally associated with the ball bearing 70 and the central tube 62. The stabilizer 75 maintains the position of the ball bearing 70 and central tube 62 after they are set by the device user. The externally adjustable needle guide 60 is a central tube 62 through a ball bearing 70 mechanism. The central tube 62 can be placed directly in the ball bearing 70 or through a hollow duct that is reversibly or non-reversibly placed through the ball bearing. The preferred embodiment is through a hallow duct placed inside of the ball bearing. The ball bearing 70 mechanism can be independent or reversibly or non-reversibly connected to the distal grid. The externally adjustable needle guide 60 may be used in conjunction with the proximal grid 20 or as a stand-alone device. The externally adjustable needle guide 60 resembles a joystick.

As illustrated in the figures and discussed above, there is also a central aperture 22 through the proximal grid 20 through which the needle (not illustrated) can be passed through. It may contain a fixation mechanism whereby the needle, the internally adjustable needle guide 50, or both can be secured. This mechanism can be a screw on or a male to female connection. In addition, these connections can be reversable or non-reversable. Additionally, there is a central aperture 32 in the distal grid 30 for passage of the needle, the internally adjustable needle guide 50, or for attachment of the externally adjustable needle guide 60. The attachment between the distal grid 30 and the externally adjustable needle guide 60 can be reversible through a screw-on or a male-female connection, or non-reversable through a permanent fixation.

In one embodiment or the instant invention, the distal grid 30 is a standalone device. When used in this matter, the distal grid 30 is generally used, but not limited to, the abdominal and perineal area or with MRI and/CT imaging. The distal grid 30 can be any shape, with the preferred embodiment being square. The distal grid can be secured in place with either with an adhesive or a standalone supporting post or attached to the operating table. The distal grid 30 has vertical and transverse radiolucent grooves whereby the externally adjustable needle guide 60 can be reversibly or irreversibly attached. The externally adjustable needle guide 60 can be independently inserted into the distal grid 30 at the desirable location using a plug-in or other similar mechanism, or the distal grid 30 can slide along the longitudinal and transverse groove to the desirable location. The distal grid 30 can accommodate one or more externally adjustable needle guides 60. The distal grid 30 has longitudinal and transverse grooves that allow the direct attachment of one or more externally adjustable needle guides 60. In another embodiment, the externally adjustable needle guide 60 can be slid along the grove to desirable location. Between the adjustable grooves, there can be radiopaque markings or direction markers 36 to allow accurate placement of the distal grid when it is used in conjunction with radiography.

Looking now to FIGS. 15-25, there is illustrated several embodiments of horizontal grids 80. Each horizontal grid includes a body 81, a top side 83, a bottom side 84 and an edge 85 around the perimeter of the grid. The horizontal grid further includes a central aperture 82 in addition to one or more needle paths 82, each of which extend through the body 81 from the top side 83 to the bottom side 84. In another embodiment, the horizontal grid 80 includes one or more needle paths 82, each of which extend through the body 81 from the top side 83 to the bottom side 84. The horizontal grid 80 further includes one or more radiopaque grid lines 89 located on or within the body of each horizontal grid. The horizontal grids 80 are used as a pair which are positioned such that the radiopaque grid lines 89 of one horizontal grid 80 are perpendicular to the radiopaque grid lines 89 of the other horizontal grid 80. The horizontal grids 80 are constructed with a material which is flexible, semi-flexible, rigid or a combination thereof. The preferred embodiment of the horizontal grid 80 is made of rigid plastic. Each grid may be of any shape or size. The preferred embodiments are square or round. In one embodiment, the horizontal grid 80 has a diameter or width of 3, 4, 5, 6, 7, 8, 9, 10, 11, 12, 13, 14, 15, or 20 centimeters. As stated previously, the horizontal grid 80 has one or more radiopaque grid lines 89. The radiopaque grid lines 89 can be of any size but are necessarily the same or smaller than the main body of the grid. In one embodiment, the radiopaque grid lines 89 are 3, 4, 5, 6, 7, 8, 9, 10, 11, 12, 13, 14, 15, or 20 centimeters in length.

Looking now to FIGS. 26-29, there is illustrated another embodiment of a needle guide 110. The needle guide 110 includes a base 111 to which a pair of vertical slide bars 120 are secured. Each vertical slide bar 120 has a channel opening 121 running through the middle of the body 122 of the vertical slide bar 120. A horizontal slide bar 130 is then slideably engaged to the pair of vertical slide bars 120. Each end of the horizontal slide bars 130 is slideably engaged to the channel opening 121 of each vertical slide bar 120 allowing the position of the horizontal slide bar 130 to change along the length of the vertical slide bars 120. The horizontal slide bar 130 has a channel opening 131 running through the middle of the body of the horizontal slide bar 130. The horizontal slide bar 130 also has a base 131 with one or more openings 133 located along the length of the base 131. A needle stabilizer 140 is slideably engaged with the horizontal slide bar 130, resting on the top of the base 131. A top plate 134 with a channel opening 135 secures the needle stabilizer 140 to the base 131 with the needle stabilizer 140 extending through the channel opening 135 and having the ability to change positions along the length of the horizontal slide bar 130. The opening 133 through the base 131 may be the same size or about the same size as the channel opening 135. The top plate 134 may further include one or more radiopaque lines 139 to aid in visualization using fluoroscopic radiography (or any other medical imaging technology) to visualize the radiopaque line(s) 139. The needle stabilizer 140 can be identical or nearly identical to the externally adjustable needle guide 60 described previously. The needle stabilizer 140 includes a body 141 slideably engaged to the base 131 of the horizontal slide bar, a ball bearing 150 with a central aperture 152, a central tube 142 secured to the ball bearing 150 and passing through the central aperture 142 where the ball bearing 150 allows the central tube 142 to be adjusted to a desired position to aid in directing the needle into a patient. The body 141 of the needle stabilizer 140 includes a top side 143, a bottom side 144, and one or more radiopaque rings. The central tube 142 has a proximal end 196, a distal end 197, an exterior surface 149, and a lumen 198 through which objects and/or a needle may be passed. The needle stabilizer 140 can also include a stabilizer 151 operationally associated with the ball bearing 150 and the central tube 142. The stabilizer 151 maintains the position of the ball bearing 150 and central tube 142 after they are set by the device user. In use, the needle guide 110 is placed on the skin of a patient. The needle stabilizer 140 is then slideably adjusted and positioned in the precise location desired by the device user. The needle stabilizer 140 is positioned over one of the openings 133 of the base 131.

Figure 30:
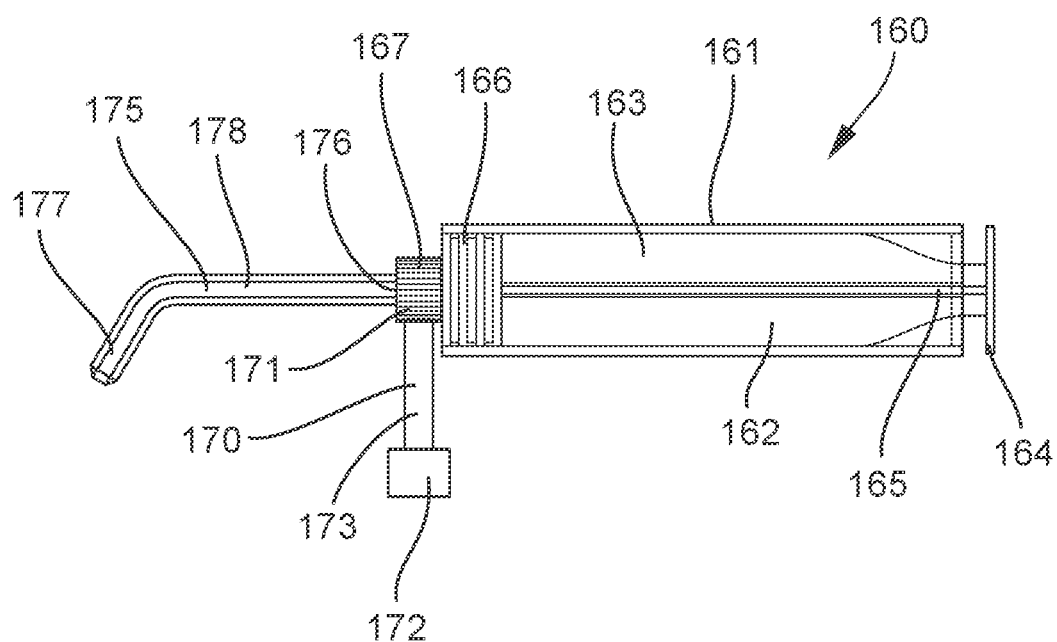
FIG. 30 is a side view of a marking device of one embodiment of the present invention.
Figure 31:
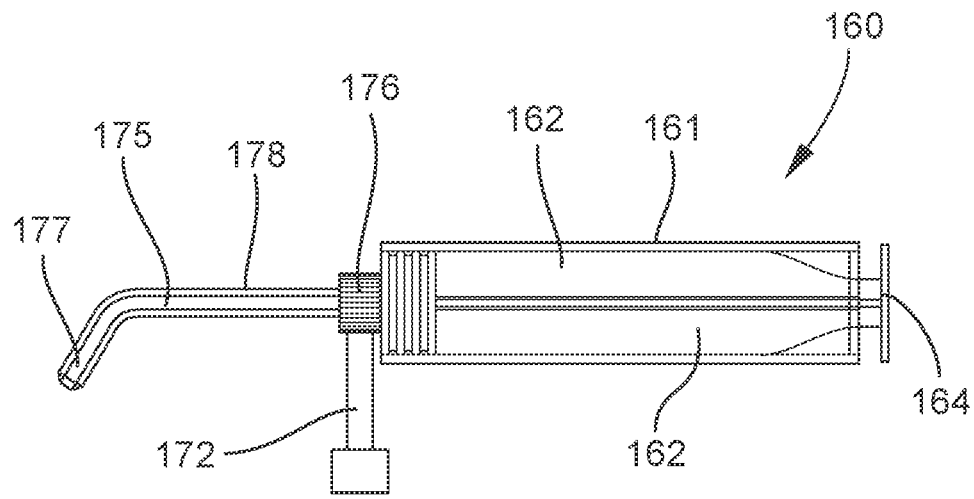
FIG. 31 is a side view of a marking device of one embodiment of the present invention.
Figure 32:
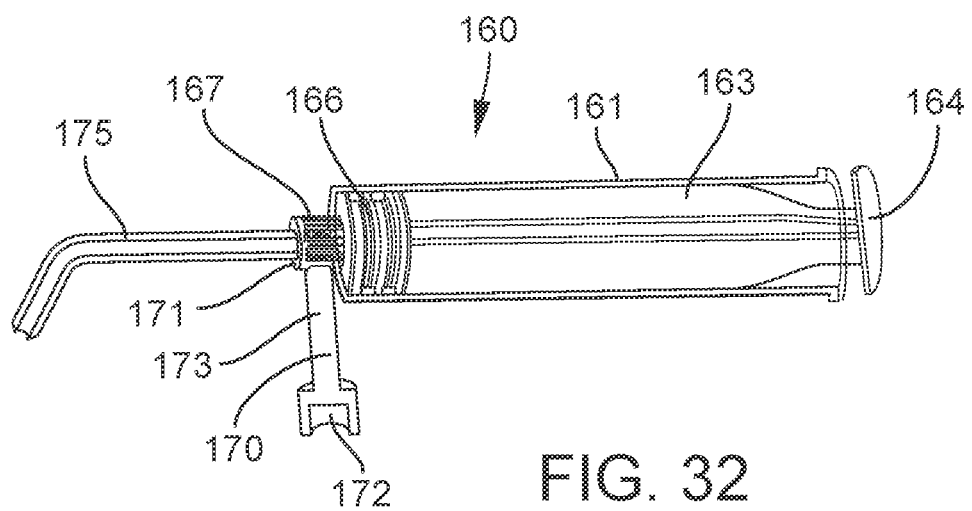
FIG. 32 is a cross section view of a marking device of one embodiment of the present invention.
Figure 34:
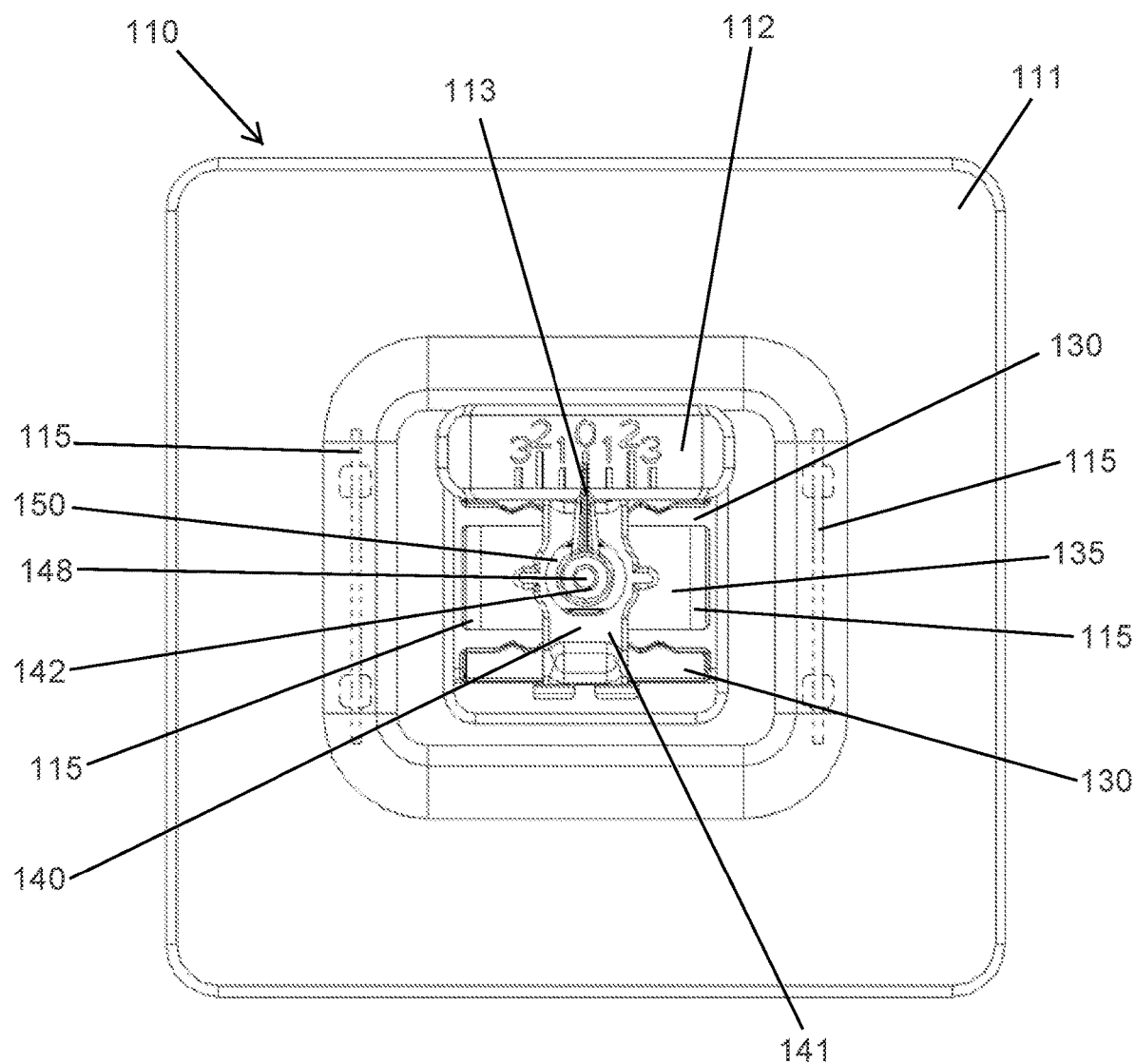
FIG. 34 is a top view of a needle guide of one embodiment of the present invention.
Figure 35:
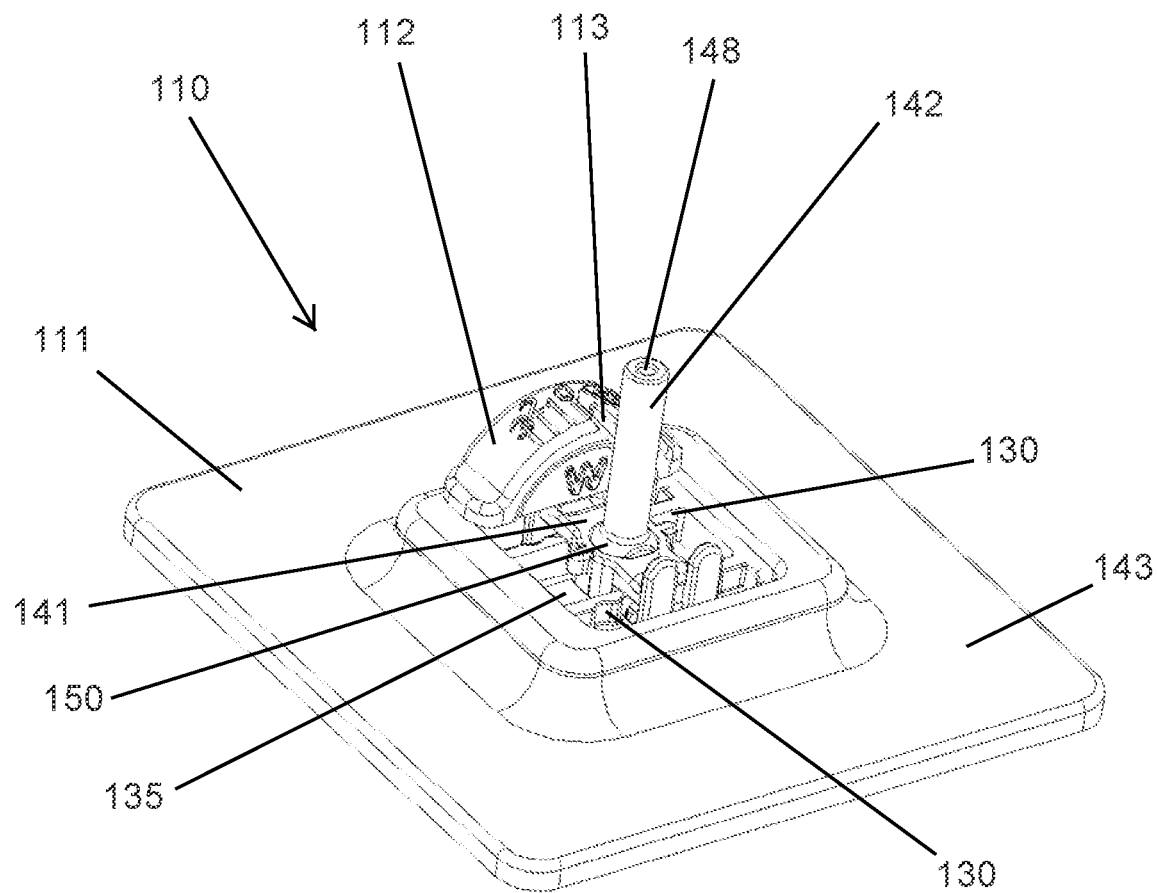
FIG. 35 is a proximal view of a needle guide of one embodiment of the present invention.
Figure 36:
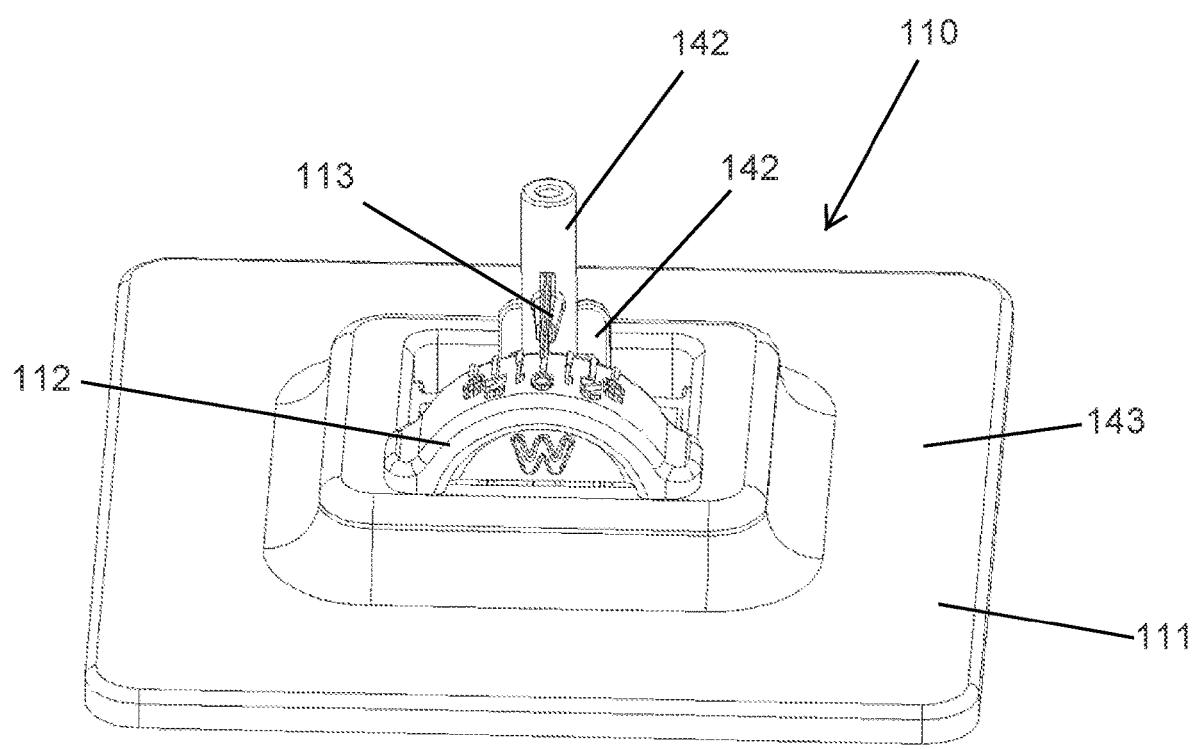
FIG. 36 is a front proximal view of a needle guide of one embodiment of the present invention.
Figure 37:
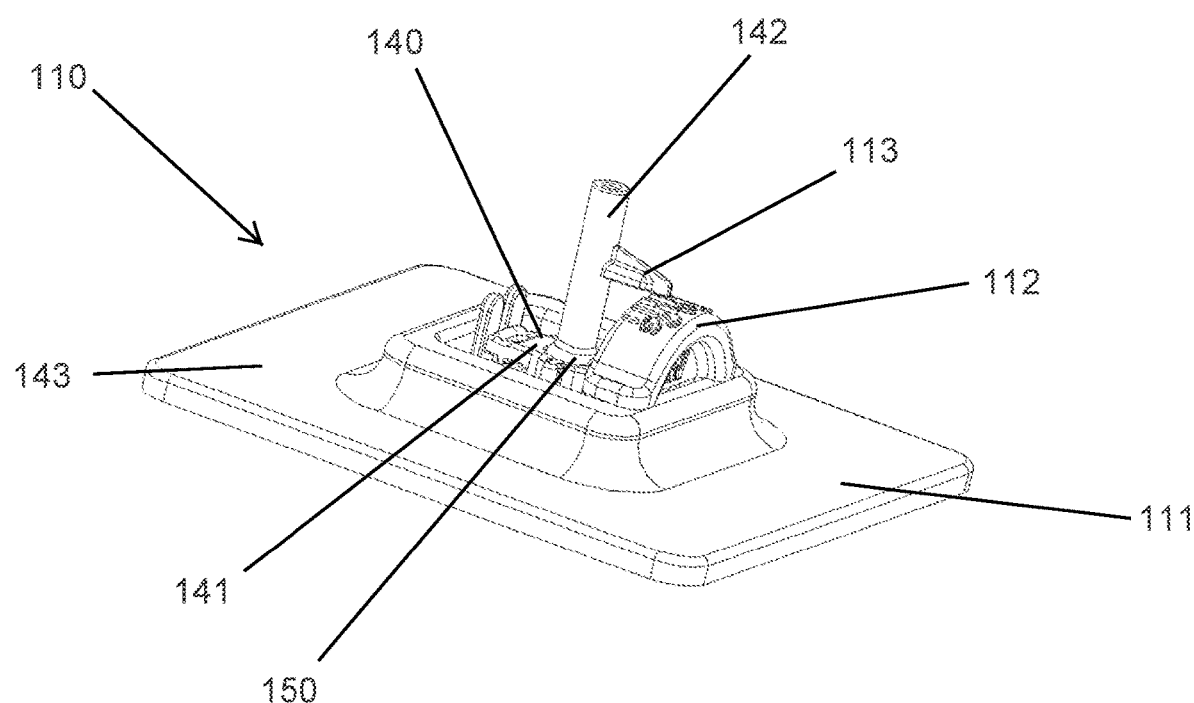
FIG. 37 is a side proximal view of a needle guide of one embodiment of the present invention.
Figure 38:
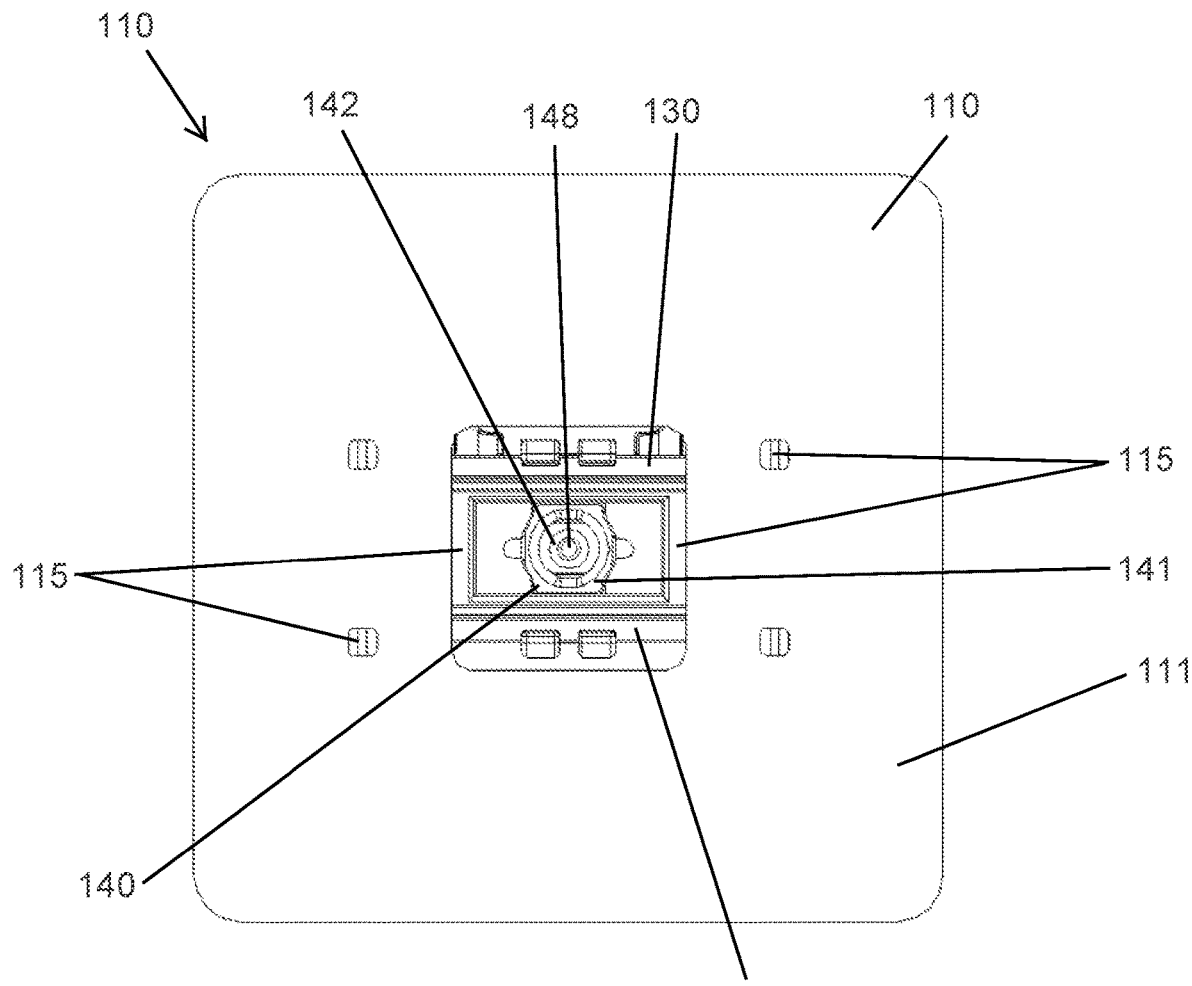
FIG. 38 is a bottom view of a needle guide of one embodiment of the present invention.
Figure 39:
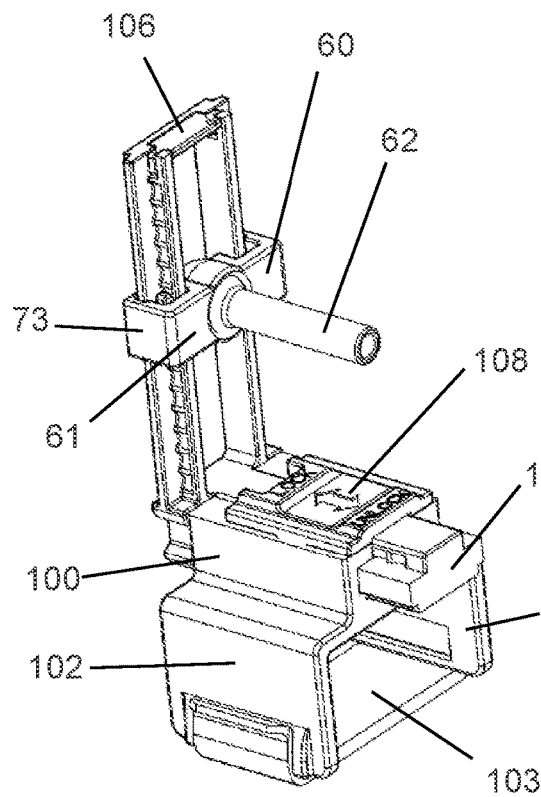
FIG. 39 is a front proximal view of a needle guide of one embodiment of the present invention.
Figure 40:
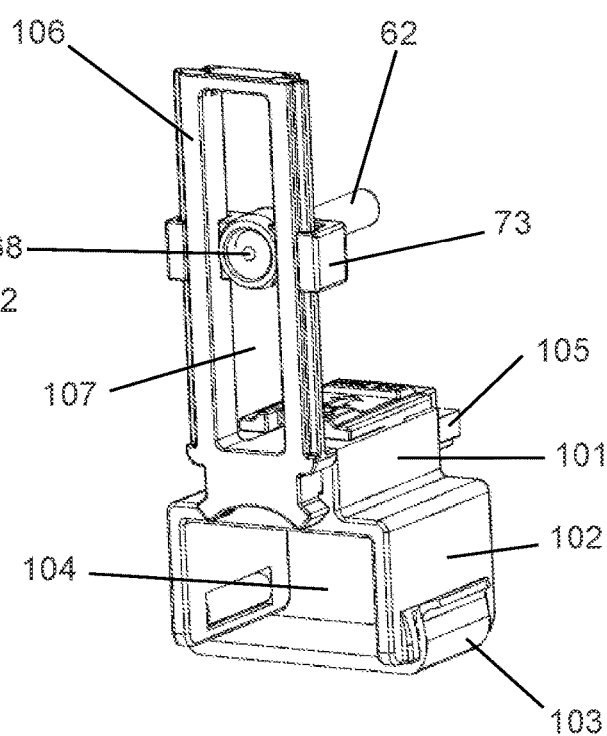
FIG. 40 is a rear proximal view of a needle guide of one embodiment of the present invention.
Figure 41:
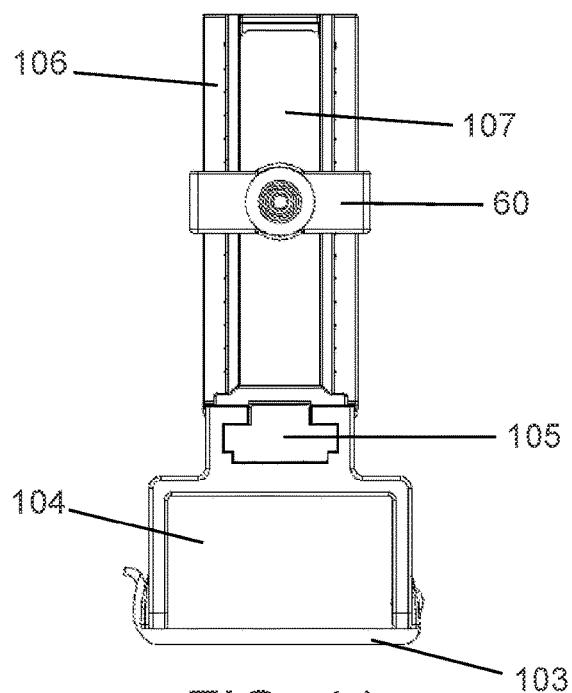
FIG. 41 is a front view of a needle guide of one embodiment of the present invention.
Figure 42:
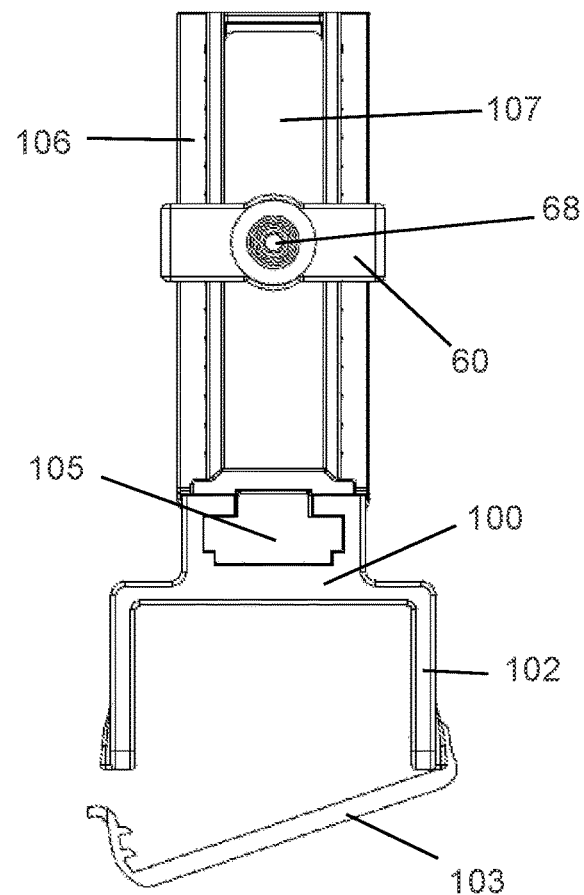
FIG. 42 is a front view of a needle guide of one embodiment of the present invention.
Figure 43:
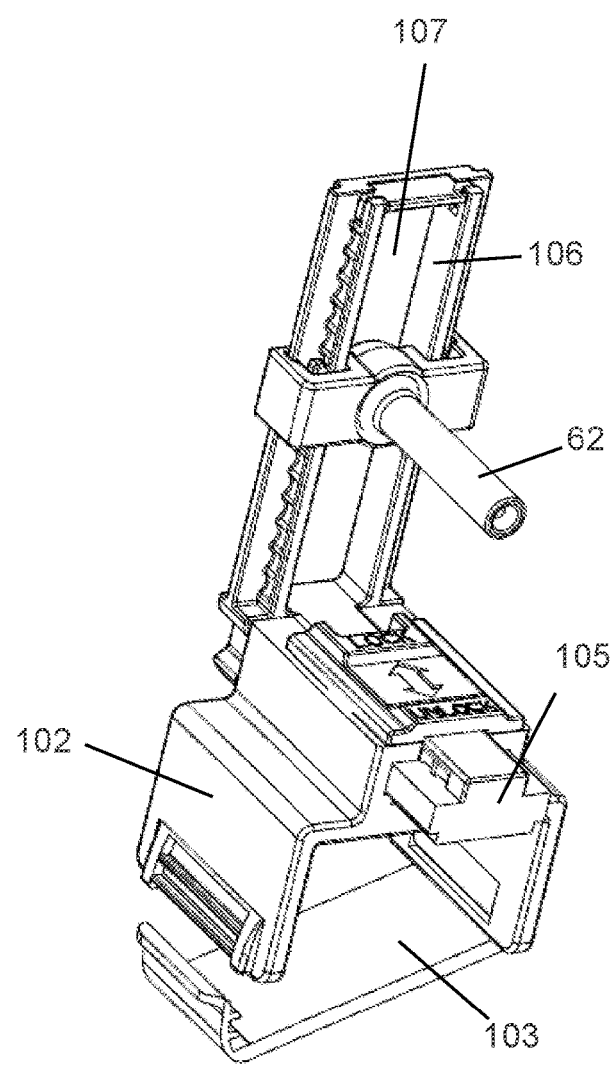
FIG. 43 is a front proximal view of a needle guide of one embodiment of the present invention.
Figure 44:
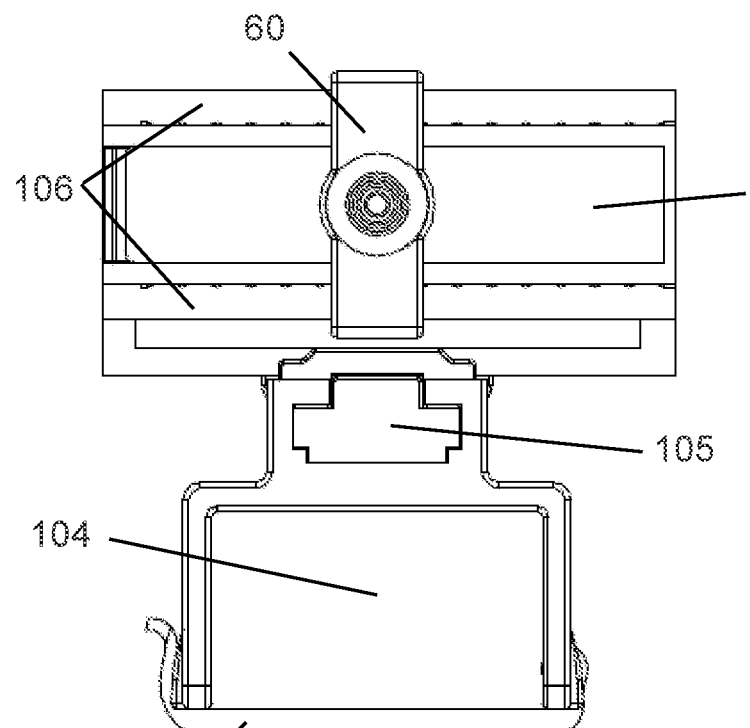
FIG. 44 is a front view of a needle guide of one embodiment of the present invention.
Figure 45:
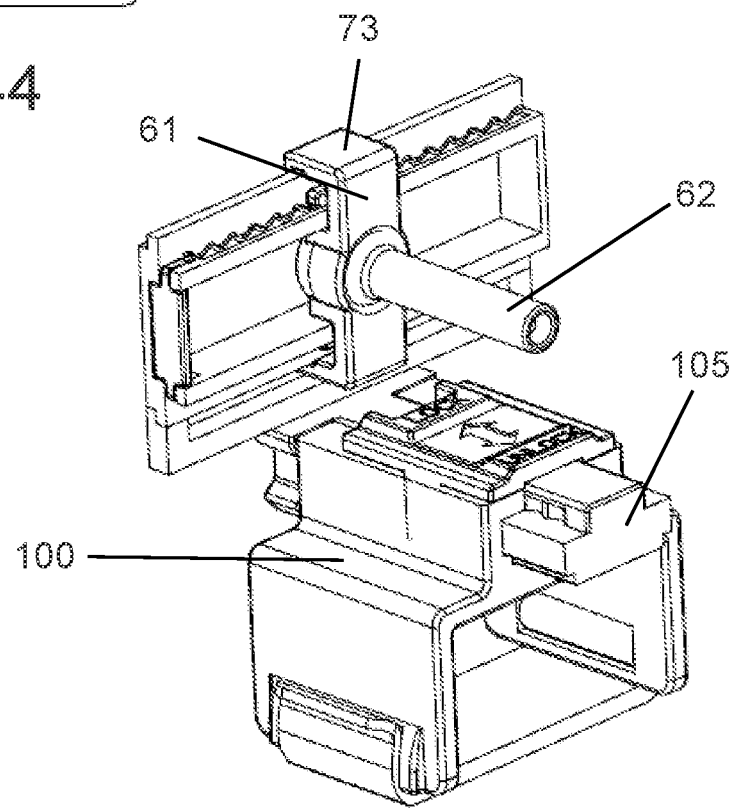
FIG. 45 is a proximal view of a needle guide of one embodiment of the present invention.
Figure 46:
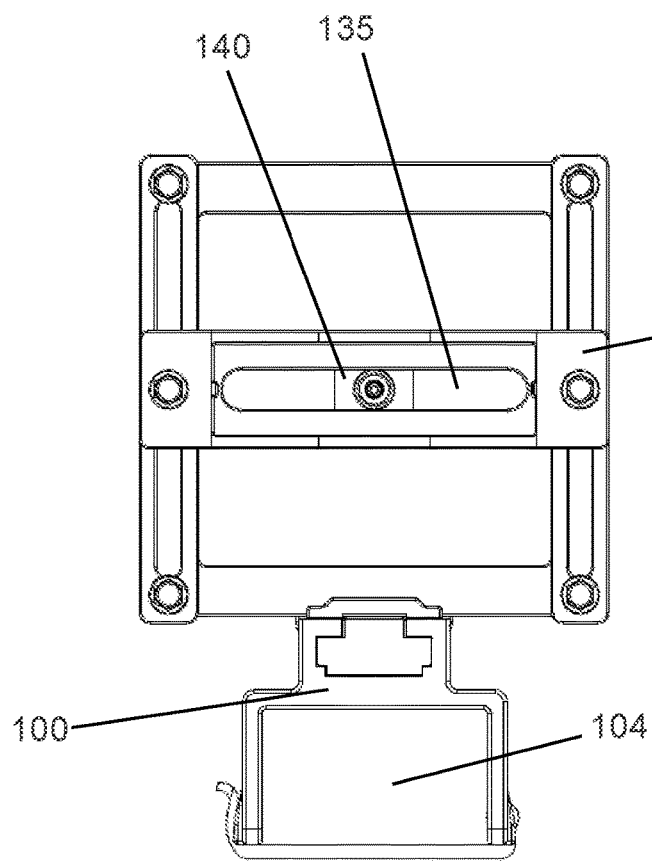
FIG. 46 is a front view of a needle guide of one embodiment of the present invention.
Figure 47:
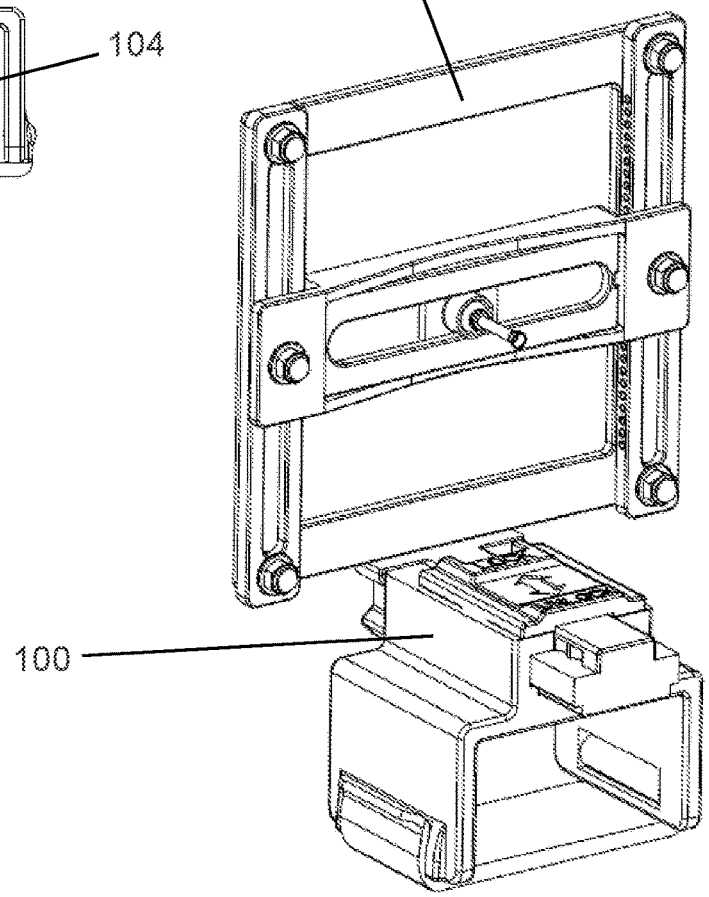
FIG. 47 is a proximal view of a needle guide of one embodiment of the present invention.
Figure 48:
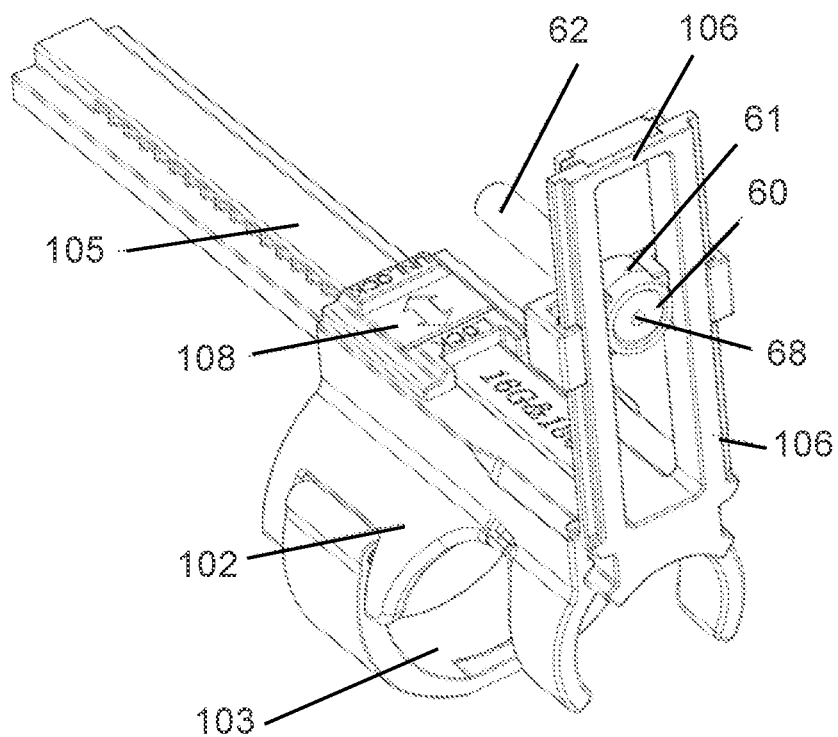
FIG. 48 is a proximal frontal view of a needle guide of one embodiment of the present invention.
Figure 49:
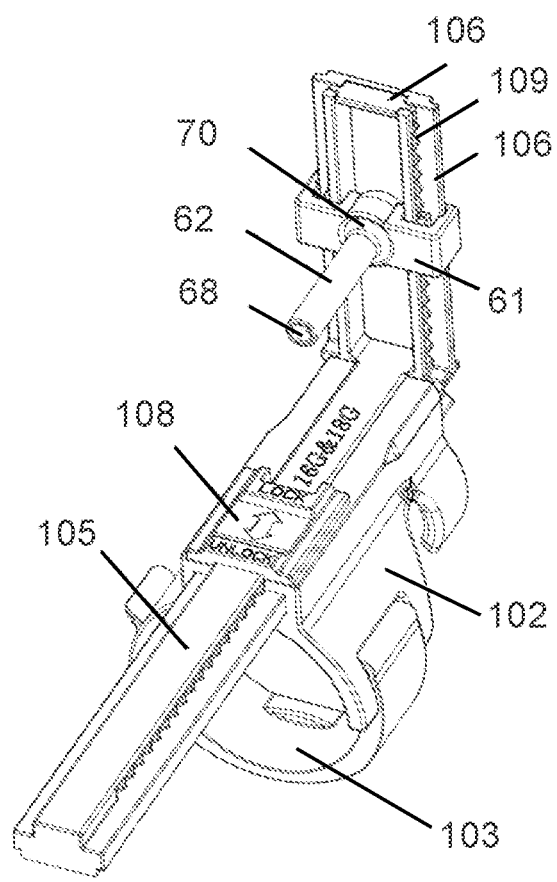
FIG. 49 is a proximal rear view of a needle guide of one embodiment of the present invention.
Figure 50:
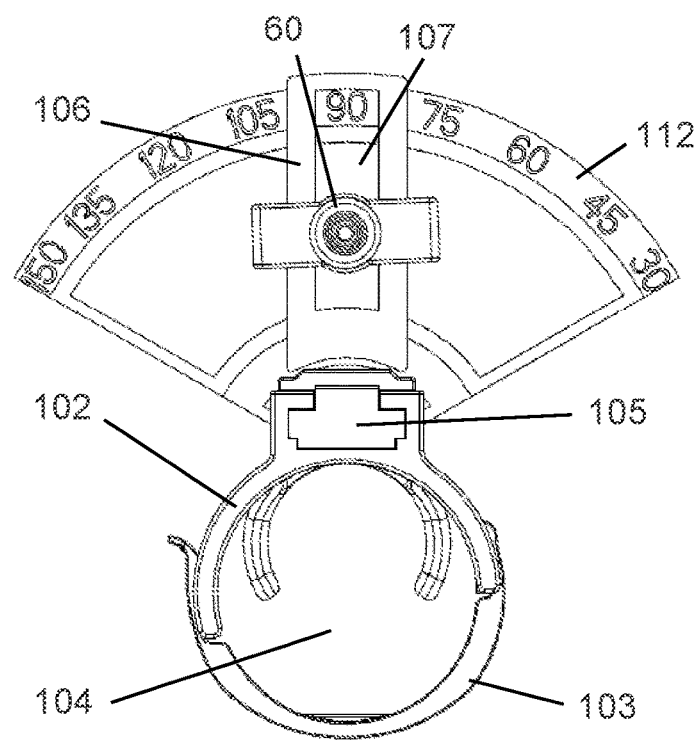
FIG. 50 is a front view of a needle guide of one embodiment of the present invention.
Figure 51:
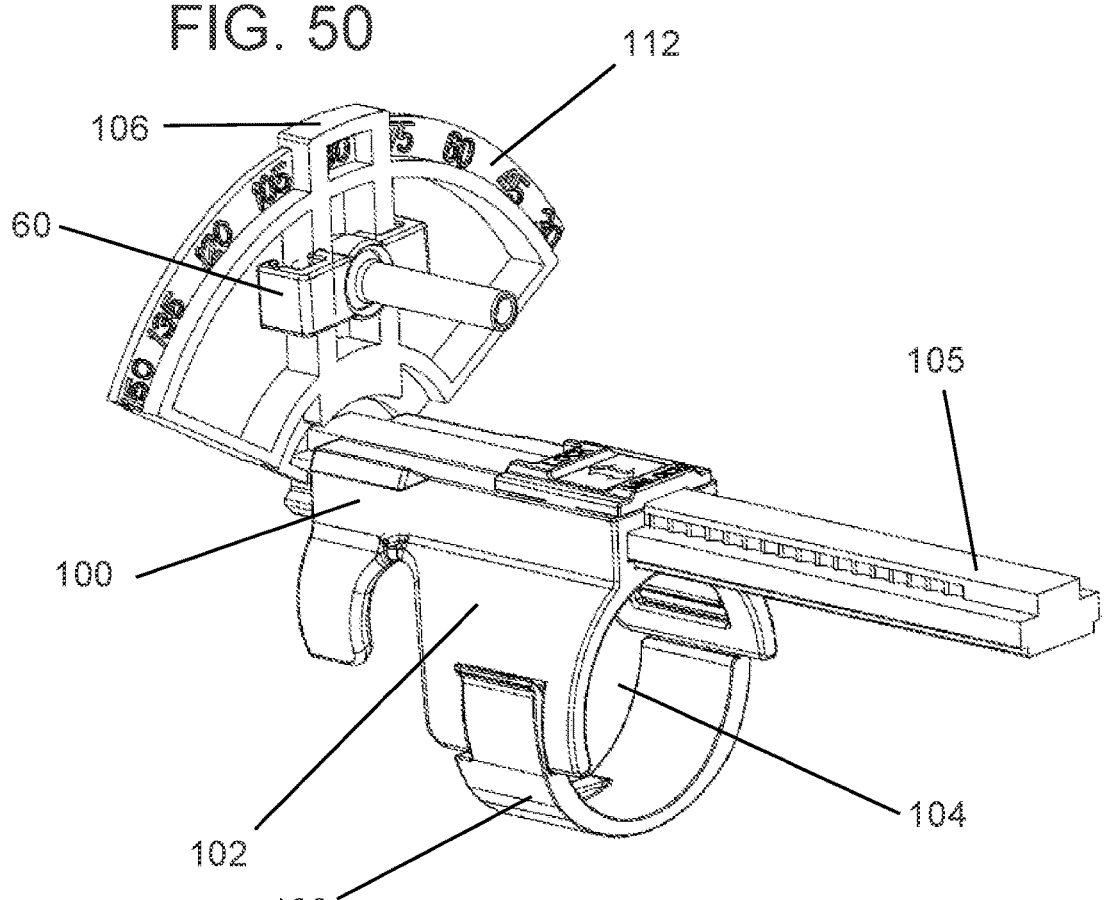
FIG. 51 is a proximal side view of a needle guide of one embodiment of the present invention.

Looking now to FIGS. 30-32, there is illustrated a marking device 160 which can be used in conjunction with any of the needle guides previously described. The marking device 160 includes an injection syringe 161 which includes a body 162, a chamber 163, and a plunger 164. The chamber 163 may be filled with any type of marking material known in the art and dispensed by depressing the plunger 164. The body has a proximal end 165 and a distal end 166 and a nozzle 167 through which marking material flows. The marking device 160 can also include an anchor mechanism 170 releasably engaged to the nozzle 167 of the injection syringe 161. The anchor mechanism 170 includes a proximal end 171 engaged to the nozzle 167, a shaft 173 emanating away from the proximal end to the distal end 172. The marking device 160 further includes a delivery tip 175 which is releasably engaged to the nozzle 167. The delivery tip 175 includes a proximal end 176, a distal end 177 and a hollow tube through which marking material flows and is delivered to the area to be marked.

Looking now to FIGS. 33-38, there is illustrated another embodiment of a needle guide 110. The needle guide 110 includes a base 111 to which a pair of horizontal slide bars 130 are secured, the horizontal slide bars including a channel 135 opening running between the bars. The needle guide 110 includes a needle stabilizer 140 with a central tube 142 slidably engaged with the pair of horizontal slide bars 130, wherein the needle stabilizer 140 extends through the channel opening 135 and has an ability to change positions along a length of the horizontal slide bars 130. The needle guide 110 may include an angular ruler 112 secured to the base 111 and located proximal to the needle stabilizer 140 to allow accurate adjustment of an angle of the central tube 142 of the needle stabilizer 140 or externally adjustable needle guide 60. The needle guide can include a top plate as described previously. The needle stabilizer 140 includes a body 141 slideably engaged to the horizontal slide bar 130, a ball bearing 150 with a central aperture 152, a central tube 142 secured to the ball bearing 150 and passing through the central aperture 152 where the ball bearing 150 allows the central tube 142 to be adjusted to a desired position to aid in directing the needle into a patient. The body 141 of the needle stabilizer 140 includes a top side 143, a bottom side 144, any may include radiopaque rings. The central tube 142 has a proximal end, a distal end, an exterior surface, and a lumen 148 through which objects and/or a needle may be passed. In use, the needle guide 110 is placed on the skin of a patient. The needle stabilizer 140 is then slideably adjusted and positioned in the precise location desired by the device user. The needle guide 110 can include one or more radiopaque lines or virtual visualization bars 115 to aid in visualization using radiography, ultrasound, or magnetic resonance (or any other medical imaging technology) to visualize the radiopaque lines or virtual visualization bars 115. The needle guide can be an externally adjustable needle guide 60 as described previously.

The needle guide 110 may include an angular ruler arm 113 extending off of the central tube 142 in the direction of the angular ruler 112 to better assist a user with accurate adjustment of an angle of the central tube 142. Angular ruler 112 is attached to the needle stabilizer 140 and can move along the horizontal bars in tandem with the needle stabilizer.

The needle guide 110 may include an internal adjustable needle guide 50 that is non-detachably associated with the externally adjustable needle guide 60, wherein the internal adjustable needle guide 50 is inserted through a central passage of a ball bearing on the needle stabilizer 140 and secured to the ball bearing 150 or stabilizer 140 through a locking mechanism. The needle guide 110 may include an internal adjustable needle guide 50 that is detachably associated with the externally adjustable needle guide 60 wherein the internal adjustable guide 50 is inserted through the externally adjustable guide 60 and can be locked in place through a luer lock, Tuohy Borst connection, or other locking mechanism.

The needle guide 110 may include a probe holder 100 (See FIGS. 39-51) to assist with securing any kind of probe device or imaging modality including radiography, ultrasound, or magnetic resonance (or any other medical imaging technology). The probe holder 100 includes a body 101 with a pair of arms 102 emanating down from the body 101, a door 103 hingedly secured to one arm 102 and able to swing and engage the other arm 102, creating an opening 104 which can secure a probe or imaging modality (i.e., ultrasonic probe). The opening created by the door may be circular, rectangular, square, or any other shape to secure the probe. A vertical slide bar 105 is slideably engaged with the body 101 of the probe holder, allowing the body 101 to slide vertically, relative to a patient, along the vertical slide bar 105. A horizontal slide bar 106 is secured to the vertical slide bar 105, the horizontal slide bar 106 having a pair of bars with a channel opening 107 through its center. The pair of bars may include teeth 109 to assist in placing the needle stabilizer 140 or externally adjustable needle guide 60. The figures illustrate an externally adjustable needle guide 60 engaged with the horizontal slide bar 106. The externally adjustable needle guide 60 includes a body 61 with a pair of arms 73 emanating down and each arm wrapping around a bar of the horizontal slide bar 106. The needle stabilizer 140 or externally adjustable needle guide 60 is slideably engaged to the horizontal slide bar 106 and extends through the channel opening 107 and has the ability to change positions along a length of the horizontal slide bar 106.

The needle guide 110 may include an angular ruler 112 secured to the horizontal slide bar 106 and located proximal to the needle stabilizer 140 or externally adjustable needle guide 60 to allow accurate adjustment of an angle of the needle stabilizer 140 or externally adjustable needle guide 60. The needle guide 110 can include a horizontal slide bar 106 which is a semi-circular track which allows the needle stabilizer 140 or externally adjustable needle guide 60 to side along the semi-circular track, extending through the channel opening 107 and has the ability to change positions along a length of the semi-circular track-shaped horizontal slide bar 106.

The instant invention includes a needle guide 110 comprising a base 111 to which a pair of horizontal slide bars 130 are secured, the horizontal slide bars including a channel opening 135 running between the bars. The needle guide 110 includes a needle stabilizer 140 with a central tube 142 slideably engaged with the pair of horizontal slide bars 130, wherein the needle stabilizer 140 extends through the channel opening 135 and has an ability to change positions along a length of the horizontal slide bar 130. The needle guide 110 may include an angular ruler 112 secured to the base 111 and located proximal to the needle stabilizer 140 to allow accurate adjustment of an angle of the central tube 142 of the needle stabilizer 140 or externally adjustable needle guide 60. The needle guide 110 can include one or more radiopaque lines or virtual visualization bars 115 to aid in visualization using an imaging modality including radiography, ultrasound, or magnetic resonance (or any other medical imaging technology) to visualize the radiopaque lines or virtual visualization bars 115. The needle guide can be an externally adjustable needle guide 60 as described previously. The needle guide can include a top plate as described previously. The needle stabilizer 140 includes a body 141 slideably engaged to the horizontal slide bar 130, a ball bearing 150 with a central aperture 152, a central tube 142 secured to the ball bearing 150 and passing through the central aperture 152 where the ball bearing 150 allows the central tube 142 to be adjusted to a desired position to aid in directing the needle into a patient. The body 141 of the needle stabilizer 140 includes a top side 143, a bottom side 144, any may include radiopaque rings. The central tube 142 has a proximal end, a distal end, an exterior surface, and a lumen 148 through which objects and/or a needle may be passed. In use, the needle guide 110 is placed on the skin of a patient. The needle stabilizer 140 is then slideably adjusted and positioned in the precise location desired by the device user.

The needle guide 110 may include an internal adjustable needle guide 50 that is non-detachably associated with the externally adjustable needle guide 60, wherein the internal adjustable needle guide 50 is inserted through a central passage of a ball bearing on the needle stabilizer 140 and secured to the ball bearing 150 or stabilizer 140 through a locking mechanism. The needle guide 110 may include an internal adjustable needle guide 50 that is detachably associated with the externally adjustable needle guide 60 wherein the internal adjustable guide 50 is inserted through the externally adjustable guide 60 and can be locked in place through a luer lock, Tuohy Borst connection, or other locking mechanism.

The needle guide 110 may include a probe holder 100 (See FIGS. 39-51) to assist with securing any kind of probe device or imaging modality including radiography, ultrasound, or magnetic resonance (or any other medical imaging technology). The probe holder 100 includes a body 101 with a pair of arms 102 emanating down from the body 101, a door 103 hingedly secured to one arm 102 and able to swing and engage the other arm 102, creating an opening 104 which can secure a probe or imaging modality (i.e., ultrasonic probe). The opening created by the door may be circular, rectangular, square, or any other shape to secure the probe. A vertical slide bar 105 is slideably engaged with the body 101 of the probe holder, allowing the body 101 to slide vertically, relative to a patient, along the vertical slide bar 105. A horizontal slide bar 106 is secured to the vertical slide bar 105, the horizontal slide bar 106 having a pair of bars with a channel opening 107 through its center. The pair of bars may include teeth 109 to assist in placing the needle stabilizer 140 or externally adjustable needle guide 60. The figures illustrate an externally adjustable needle guide 60 engaged with the horizontal slide bar 106. The externally adjustable needle guide 60 includes a body 61 with a pair of arms 73 emanating down and each arm wrapping around a bar of the horizontal slide bar 106. The needle stabilizer 140 or externally adjustable needle guide 60 is slideably engaged to the horizontal slide bar 106 and extends through the channel opening 107 and has the ability to change positions along a length of the horizontal slide bar 106.

The needle guide 110 may include an angular ruler 112 secured to the horizontal slide bar 106 and located proximal to the needle stabilizer 140 or externally adjustable needle guide 60 to allow accurate adjustment of an angle of the needle stabilizer 140 or externally adjustable needle guide 60. The needle guide 110 can include a horizontal slide bar 106 which is a semi-circular track which allows the needle stabilizer 140 or externally adjustable needle guide 60 to side along the semi-circular track, extending through the channel opening 107 and has the ability to change positions along a length of the semi-circular track-shaped horizontal slide bar 106.

The instant invention also includes a variety of methods of positioning a needle within a patient. In one of the methods described herein, the distal grid 30 (near the patient and away from the operator who is holding the needle and the image receptor) is placed on the surface of the skin on the patient at the point of needle entrance as a stand-alone device. The needle is inserted into the central aperture 32 of grid 30 or lumen 48 of the central tube 42. Both the central tube 42 and the grid 30 are aligned with the target location using the radiopaque ring(s) 39 and/or the direction markers 36 using fluoroscopic radiography or any other appropriate imaging technology. The adjustment can be steered using the direction markers 36. The needle, alone or with central tube 42, are advanced through the central aperture 32 of the distal grid 30. This will allow a circle and dot appearance on radiography to allow accurate advancement of the puncture needle with or without central tube 42, an improved variation of bull's eye technique. The fluoroscope can be turned periodically 30 to 90 degrees axially along the needle to check the depth of penetration of the needle (with or without central tube) until it reaches the target location. The needle can be further adjusted internally by withdrawing from the central tube 42, maneuver the central tube 42 to the desirable path, then reinsert the needle and advance both the needle and the central tube 42 into the target location.

In another method, an externally adjustable needle guide 60 is operatively associated with a distal grid 30. The distal grid 30 and externally adjustable needle guide 60 are placed on the surface of the skin on the patient at the point of needle entrance as a stand-alone device. The needle is inserted into the lumen 68 of the central tube 62. Both the central tube 62 and the grid 30 are aligned with the target location using the radiopaque ring(s) 39 and/or the direction markers 36 using fluoroscopic radiography or any other appropriate imaging technology. The adjustment can be steered using the direction markers 36 and ball bearing 70. The needle is advanced through the central tube 62 and the central aperture 32 of the distal grid 30. This will allow a circle and dot appearance on radiography to allow accurate advancement of the puncture needle with central tube 62, an improved variation of bull's eye technique. The fluoroscope can be turned periodically 30 to 90 degrees axially along the needle to check the depth of penetration of the needle (with or without central tube) until it reaches the target location. The needle can be further adjusted internally by withdrawing from the central tube 62, maneuver the central tube 62 to the desirable path, then reinsert the needle and advance the needle into the target location. In another version, the externally adjustable needle guide 60 can be used without the distal grid 30 as a stand-alone device.

In another method described herein, the distal grid 30 (near the patient and away from the operator who is holding the needle and the image receptor) is placed on the surface of the skin on the patient at the point of needle entrance. The needle is inserted into the lumen 48 of the central tube 42 and both are then slideably engaged with the central aperture 22 of the proximal grid 20 and advanced toward the hub 43 of the central tube. The proximal and distal grids are aligned with the target location using the radiopaque rings 29, 39 and/or the direction markers 26, 36 using fluoroscopic radiography or any other appropriate imaging technology. The radiopaque ring 29 (aiming ring) of the proximal grid 20 will appear to be larger than the radiopaque ring 39 (aiming ring) of the distal grid 30 on the x-ray image using the two-dimensional aiming technique. The needle, central tube 42 and the proximal grid 20 are then maneuvered until both aiming rings 29, 39 are concentric and aligned with the target. The adjustment can be steered using the direct markers 26. The needle and central tube 42 are advanced through the central aperture 32 of the distal grid 30 while the two aiming rings 29, 39 remaining concentric, like aiming a rifle through its aiming sights. The proximal grid 20 will move along with the needle and central tube 42 toward the distal grid 30 as the needle is inserted into the patient, toward the target location. The sizes of two aiming rings 29, 39 will become the same. The fluoroscope can be turned periodically 30 to 90 degrees axially along the needle to check the depth of penetration of the needle until it reaches the target location. The needle can be further adjusted internally by withdrawing from the central tube 42 of the internal adjustable needle guide 50, maneuver the central tube 42 to the desirable path, then reinsert the needle and advance both the needle and the central tube 42 into the target location.

In another method, the distal grid 30 is placed on the surface of the skin on the patient at the point of needle entrance. The central tube 42 is secured to the central aperture 22 of the proximal grid at the hub 43 using the lure lock connector. The needle is inserted through the central aperture 22 of the proximal grid and into the lumen 48 of the central tube 42 and both are then slideably engaged with the central aperture 32 of the distal grid 20. The proximal and distal grids are aligned with the target location using the radiopaque rings 29, 39 and/or the direction markers 26 using fluoroscopic radiography or any other appropriate imaging technology. The radiopaque ring 29 (aiming ring) of the proximal grid 20 will appear to be larger than the radiopaque ring 39 (aiming ring) of the distal grid 30 on the x-ray image using the two-dimensional aiming technique. The needle, central tube 42 and the proximal grid 20 are then maneuvered until both aiming rings 29, 39 are concentric and aligned with the target. The adjustment can be steered using the direct markers 26. The needle and central tube 42 are advanced through the central aperture 32 of the distal grid 30 while the two aiming rings 29, 39 remaining concentric, like aiming a rifle through its aiming sights. The proximal grid 20 will move along with the needle and central tube 42 toward the distal grid 30 as the needle is inserted into the patient, toward the target location. The sizes of two aiming rings 29, 39 will become the same. The fluoroscope can be turned periodically 30 to 90 degrees axially along the needle to check the depth of penetration of the needle until it reaches the target location. The needle can be further adjusted internally by withdrawing from the central tube 42 of the internal adjustable needle guide 50, maneuver the central tube 42 to the desirable path, then reinsert the needle and advance both the needle and the central tube 42 into the target location.

One method of positioning a needle within a patient comprises the steps of:
a) providing an imaging needle guide 10 comprising
   a proximal grid 20 including a body 21, a top side 23, a bottom side 24, one or more radiopaque rings 29, and a central aperture 22 extending through the body 21 from the top side 23 to the bottom side 24;
   a distal grid 30 including a body 31, a top side 33, a bottom side 34, one or more radiopaque rings 39, and a central aperture 32 extending through the body 31 from the top side 33 to the bottom side 34; and
   a needle;
b) placing the distal grid 30 on a patient at the point of needle entrance;
c) inserting the needle into a lumen 48 of a central tube 42 and both are then inserted through the central aperture 22 of the proximal grid 20 and advanced toward the hub of the central tube 42; or
d) securing a central tube 42 to the central aperture 22 of the proximal grid using the lure lock connector and inserting the needle through the central aperture 22 of the proximal grid and into the lumen 48 of the central tube 42;
e) advancing the needle through the central aperture 22 of the proximal grid 20 and through the central tube 42 toward the hub 43;
f) inserting the needle and the central tube 42 into the central aperture 32 of the distal ring 30;
g) aligning the proximal grid 20 and the distal grid 30 using fluoroscopic radiography (or any other medical imaging technology) to visualize the radiopaque rings 29, 39 of each grid;
h) advancing the needle and the central tube 42 through the central aperture 32 of the distal ring 30;
i) verifying the location of the needle and/or the central tube 42 within the patient using fluoroscopic radiography (or any other medical imaging technology);
j) repeating steps g through i until the needle is positioned in a desired location.

Another method of positioning a needle within a patient comprising the steps of:
a) providing an imaging needle guide 10 comprising
   a proximal grid 20 including a body 21, a top side 23, a bottom side 24, one or more radiopaque rings 29, a central aperture 22 extending through the body 21 from the top side 23 to the bottom side 24, and a proximal arm 27 and/or distal arm 28 emanating from the body 21 of the proximal grid 20;
   a distal grid 30 including a body 31, a top side 33, a bottom side 34, one or more radiopaque rings 39, and a central aperture 32 extending through the body 31 from the top side 33 to the bottom side 34;
   a handle 95 or clamp to aid in maintaining the location/position of the proximal grid and aiming the proximal grid, operatively associated with:
   the proximal grid 20;
   the proximal arm 27; and/or
   the distal arm 28;
   a needle;
b) placing the distal grid 30 on a patient at the point of needle entrance;
c) securing the handle 95 or clamp to the proximal grid 20, proximal arm, and/or distal arm;
d) inserting the needle through the central aperture 22 of the proximal grid 20 or through a central tube 52 engaged to the distal grid 30 at one end and slideably engaged to the proximal grid 20 at the opposite end, wherein the proximal grid 20 can slide along the hollow axle and become an external needle guide;
e) inserting the needle into the central aperture 32 of the distal ring 30;
f) aligning the proximal grid 20 and the distal grid 30 using fluoroscopic radiography (or any other medical imaging technology) to visualize the radiopaque rings 29, 39 of each grid;
g) adjusting the location of the handle or clamp;
h) advancing the needle through the central aperture 32 of the distal ring 30 or through the central tube 52 and the distal ring 30;
i) verifying the location of the needle within the patient using fluoroscopic radiography (or any other medical imaging technology);
j) repeating steps f through i until the needle is positioned in a desired location.

An additional method includes the use of an internally adjustable needle guide 50 as described previously. The internally adjustable needle guide 50 is secured to a distal grid 30 which is then placed on a patient at the point of needle entrance. The central tube 42 is inserted into a patient at the point of needle entrance. A needle is inserted through the central aperture 22 of a proximal grid 20, advanced toward the hub of the central tube 42 and secured to the proximal grid. The proximal and distal grids are aligned with the target location using the radiopaque rings 29, 39 and/or the direction markers 26 using fluoroscopic radiography or any other appropriate imaging technology. The radiopaque ring 29 (aiming ring) of the proximal grid 20 will appear to be larger than the radiopaque ring 39 (aiming ring) of the distal grid 30 on the x-ray image using the two-dimensional aiming technique. The needle, the central tube 42, and the proximal grid 20 are then maneuvered until both aiming rings 29, 39 are concentric and aligned with the target. The adjustment can be steered using the direct markers 26. The point of the needle and the central tube 42 is then passed through the central aperture 32 of the distal grid and into the lumen 48 of the central tube 42. The needle and the central tube 42 are advanced through the central aperture 32 of the distal grid 30 while the two aiming rings 29, 39 remaining concentric, like aiming a rifle through its aiming sights. The proximal grid 20 will move along the needle toward the distal grid 30 and the internally adjustable needle guide 50 as the needle and the central tube 42 are inserted into the patient, toward the target location. The sizes of two aiming rings 29, 39 will become the same. The fluoroscope can be turned periodically 30 to 90 degrees axially along the needle to check the depth of penetration of the needle until it reaches the target location. If the direction of the needle and the central tube 42 path needs to be adjusted, the needle tip can be retracted into the central tube 42. The path can then be adjusted using the central tube 42 of the internally adjustable needle guide 50. The central tube 42 is more rigid than the needle thus allows easier redirection.

In step-wise fashion, the method of positioning a needle within a patient comprises the steps of:

a) providing an imaging needle guide 10 comprising:
- a proximal grid 20 including a body 21, a top side 23, a bottom side 24, one or more radiopaque rings 29, and a central aperture 22 extending through the body 21 from the top side 23 to the bottom side 24;
- a distal grid 30 including a body 31, a top side 33, a bottom side 34, one or more radiopaque rings 39, and a central aperture 32 extending through the body 31 from the top side 33 to the bottom side 34;
- an internally adjustable needle guide 50 operatively associated with the distal grid 30, which includes a body 51 secured to the distal grid 30, a central tube 42 secured to the body 51 and passing through the central aperture 32;
  - where the central tube 42 is designed to be inserted into a patient at a desired position to aid in directing the needle into a patient;
  - where the body 51 of the internally adjustable needle guide 50 includes a top side 53, a bottom side 54, one or more radiopaque rings 59, and an edge 55 around the perimeter of the body; and
  - the central tube 42 has a proximal end 46, a distal end 47, a hub 43 secured to the proximal end, and a lumen 48 through which objects and/or
- a needle may be passed; and
- a needle;

b) placing the distal grid 30 on a patient at the point of needle entrance;

c) inserting the needle through the central aperture 22 of the proximal grid 20;

d) advancing the needle through the central aperture 22 of the proximal grid 20;

e) inserting the needle into the central aperture 32 of the distal ring 30 and into the lumen 48 of the central tube 42;

f) aligning the proximal grid 20 and the distal grid 30 using fluoroscopic radiography (or any other medical imaging technology) to visualize the radiopaque rings 29, 39, 59 of each grid and guide;

g) advancing the needle and through the central aperture 32 of the distal ring 30 and the central tube 42 of the guide 50;

h) verifying the location of the needle within the patient using fluoroscopic radiography (or any other medical imaging technology);

i) repeating steps f through h until the needle is positioned in a desired location.

In another embodiment, the internally adjustable needle guide 50 can be used to place a needle within a patient comprising the steps of:

a) providing an imaging needle guide 10 comprising:
- a proximal grid 20 including a body 21, a top side 23, a bottom side 24, one or more radiopaque rings 29, and a central aperture 22 extending through the body 21 from the top side 23 to the bottom side 24;
- a distal grid 30 including a body 31, a top side 33, a bottom side 34, one or more radiopaque rings 39, and a central aperture 32 extending through the body 31 from the top side 33 to the bottom side 34;
- an internally adjustable needle guide 50 operatively associated with the distal grid 30, which includes a body 51 secured to the distal grid 30, a central tube 42;
  - where the central tube 42 is designed to be inserted into a patient at a desired position to aid in directing the needle into a patient;
  - where the body 51 of the internally adjustable needle guide 50 includes a top side 53, a bottom side 54, one or more radiopaque rings 59, and an edge 55 around the perimeter of the body; and
  - the central tube 42 has a proximal end 46, a distal end 47, a hub 43 secured to the proximal end, and a lumen 48 through which objects and/or
- a needle may be passed; and
- a needle;

b) placing the distal grid 30 on a patient at the point of needle entrance;

c) securing the hub 43 of the central tube 42 to the central aperture of the proximal grid 20;

d) inserting the needle through the central aperture 22 of the proximal grid 20;

e) advancing the needle through the central aperture 22 of the proximal grid 20 and into the lumen 48 of the central tube 42;

f) inserting the needle and the central tube 42 into the central aperture 32 of the distal ring 30 to slideably engage the distal ring;

g) aligning the proximal grid 20 and the distal grid 30 using fluoroscopic radiography (or any other medical imaging technology) to visualize the radiopaque rings 29, 39, 59 of each grid and guide;

h) advancing the needle and the central tube 42 of the internally adjustable needle guide 50 through the central aperture 32 of the distal ring 30;

i) verifying the location of the needle within the patient using fluoroscopic radiography (or any other medical imaging technology);

j) repeating steps g through i until the needle and/or the central tube 42 are positioned in a desired location.

An additional method includes the use of an externally adjustable needle guide 60 as described previously. The externally adjustable needle guide 60 is secured to a distal grid 30 which is then placed on a patient at the point of needle entrance. The central tube 62 is adjustable at the point of needle entrance to aid in guiding a needle. The needle is inserted through the central aperture 22 of a proximal grid 20, advanced toward the hub (opposite to the pointed end) of the needle and secured to the proximal grid. The proximal and distal grids are aligned with the target location using the radiopaque rings 29, 39 and/or the direction markers 26 using fluoroscopic radiography or any other appropriate imaging technology. The radiopaque ring 29 (aiming ring) of the proximal grid 20 will appear to be larger than the radiopaque ring 39 (aiming ring) of the distal grid 30 on the x-ray image using the two-dimensional aiming technique. The needle and the proximal grid 20 are then maneuvered until both aiming rings 29, 39 are concentric and aligned with the target. The adjustment can be steered using the direct markers 26. The point of the needle is then passed into the lumen 68 of the central tube 62 until it reaches the central aperture 32 of the distal grid. The needle is advanced through the central aperture 32 of the distal grid 30 while the two aiming rings 29, 39 remaining concentric, like aiming a rifle through its aiming sights. The proximal grid 20 will move along the needle toward the externally adjustable needle guide 60 and the distal grid 30 as the needle is inserted into the patient, toward the target location. The sizes of two aiming rings 29, 39 will become the same. The fluoroscope can be turned periodically 30 to 90 degrees axially along the needle to check the depth of penetration of the needle until it reaches the target location. If the direction of the needle path needs to be adjusted, the needle tip can be retracted into the externally adjustable needle guide 60. The path can then be adjusted using the central tube 62 of the externally adjustable needle guide 60. The central tube 62 is more rigid than the needle thus allows easier redirection.

In step-wise fashion, the method of positioning a needle within a patient comprises the steps of:
a) providing an imaging needle guide 10 comprising:
  a proximal grid 20 including a body 21, a top side 23, a bottom side 24, one or more radiopaque rings 29, and a central aperture 22 extending through the body 21 from the top side 23 to the bottom side 24;
  a distal grid 30 including a body 31, a top side 33, a bottom side 34, one or more radiopaque rings 39, and a central aperture 32 extending through the body 31 from the top side 33 to the bottom side 34;
  an externally adjustable needle guide 60 operatively associated with the distal grid 30, which includes a body 61 secured to the distal grid 30, a central tube 62 secured to the body 61 and passing through the central aperture 32:
    where the central tube 62 is designed to extend away from a patient at a desired position to aid in directing the needle into a patient;
    where the body 61 of the externally adjustable needle guide 60 includes a top side 63, a bottom side 64, one or more radiopaque rings 69, and an edge 65 around the perimeter of the body; and
    the central tube 62 has a proximal end 66, a distal end 67 and a lumen 68 through which objects and/or a needle may be passed; and
  a needle;
b) placing the distal grid 30 on a patient at the point of needle entrance;
c) inserting the needle through the central aperture 22 of the proximal grid 20;
d) advancing the needle through the central aperture 22 of the proximal grid 20 or through the hollow axle toward the hub of the needle;
e) inserting the needle into the central aperture 32 of the distal ring 30 and into the lumen 68 of the central tube 62;
f) aligning the proximal grid 20 and the distal grid 30 using fluoroscopic radiography (or any other medical imaging technology) to visualize the radiopaque rings 29, 39, 69 of each grid and guide;
g) adjusting the pathway of the central tube 62 to align with the findings of step (f);
h) advancing the needle through the central tube 62 the guide 60 and the central aperture 32 of the distal ring 30;
i) verifying the location of the needle within the patient using fluoroscopic radiography (or any other medical imaging technology);
j) repeating steps f through i until the needle is positioned in a desired location.

In any method described herein using the externally adjustable needle guide 60, the stabilizer 75 may be engaged to retain the position of the central tube 62 and ball bearing 70 at any time.

The instant invention also includes a method of using a needle guide 110 to aid in the placement of a needle within a patient. In step-wise fashion, the method of positioning a needle within a patient comprises the steps of:
a) providing a needle guide 110 which includes:
  a base 111 to which a pair of vertical slide bars 120 are secured;
  a horizontal slide bar 130 is then slideably engaged to the pair of vertical slide bars 120;
    wherein the horizontal slide bar 130 has a base 131 with one or more openings 133 located along the length of the base 131;
  a needle stabilizer 140 is slideably engaged with the horizontal slide bar 130;
    wherein the needle stabilizer includes:
      a body 141 slideably engaged to the base 131 of the horizontal slide bar, the body 141 including:
        a top side 143;
        a bottom side 144; and
        one or more radiopaque rings;
      a ball bearing 150 with a central aperture 152;
      a central tube 142 secured to the ball bearing 150 and passing through the central aperture 142;
      the central tube 142 including:
        a proximal end 196;
        a distal end 197;
        an exterior surface 149;
        and a lumen 198 through which objects and/or a needle may be passed;
        where the ball bearing 150 allows the central tube 142 to be adjusted to a desired position to aid in directing the needle into a patient;
    a top plate 134 with a channel opening 135 secures the needle stabilizer 140 to the base 131 with the needle stabilizer 140 extending through the channel opening 135 and having the ability to change positions along the length of the horizontal slide bar 130;
b) placing the needle guide 110 on a patient near the point of needle entrance;
c) positioning the horizontal slide bar 130 in a desired position along a y-axis of the vertical slide bars 120;
d) positioning the needle stabilizer 140 in a desired position along an x-axis of the horizontal slide bar 130;
e) inserting the needle through the central aperture 22 of the proximal grid 20;
f) advancing the needle through the central aperture 22 of the proximal grid 20 or through the hollow axle toward the hub of the needle;
g) inserting the needle into the central aperture 32 of the distal ring 30 and into the lumen 68 of the central tube 62;
h) aligning the proximal grid 20 and the distal grid 30 using fluoroscopic radiography (or any other medical imaging technology) to visualize the radiopaque rings 29, 39, 69 of each grid and guide;
i) adjusting the pathway of the central tube 62 to align with the findings of step (f);
j) advancing the needle through the central tube 62 the guide 60 and the central aperture 32 of the distal ring 30;
k) verifying the location of the needle within the patient using fluoroscopic radiography (or any other medical imaging technology); and
l) repeating steps f through K until the needle is positioned in a desired location.

The instant invention also includes a method of using a needle guide 110 to aid in the placement of a needle within a patient. In step-wise fashion, the method of positioning a needle within a patient comprises the steps of:

19 a) providing a needle guide 110 comprising:
  a base 111 to which a pair of horizontal slide bars 130 are secured, the horizontal slide bars including a channel opening 135 running between the bars;
  a needle stabilizer 140 with a central tube 142 is slideably engaged with the pair of horizontal slide bars 130;
    wherein the needle stabilizer 140 extends through the channel opening 135 and has an ability to change positions along a length of the horizontal slide bar 135;
  an angular ruler 112 secured to the base 111 and located proximal to the needle stabilizer 140 to allow accurate adjustment of an angle of the central tube 142 of the needle stabilizer 140 or externally adjustable needle guide 60; and
  one or more virtual visualization bars 115 to aid in visualization using an imaging modality including radiography, ultrasound, or magnetic resonance (or any other medical imaging technology) to visualize the virtual visualization bars 115;
b) placing the needle guide 110 on a patient;
c) aligning the needle stabilizer 140 and the central tube 142 using the imaging modality to visualize the virtual visualization bars, the needle guide, and needle stabilizer;
d) inserting a needle into the needle stabilizer 140;
e) adjusting the angle of the needle and needle stabilizer (i.e., the central tube 142 of the needle stabilizer 140 or externally adjustable needle guide 60) using the angular ruler 112 based on information obtained from the imaging modality stated in (c);
f) advancing the needle through the needle stabilizer 140;
g) verifying the location of the needle within the patient using imaging modalities stated in (c); and
h) repeating steps e through g until the needle is positioned in a desired location.

The method above may further comprise the steps of:
in step (a), further providing a probe holder 100 comprising:
  a body 101 with a pair of arms 102 emanating down from the body;
  a door 103 hingedly secured to one arm 102 and able to swing and engage the other arm 102, creating an opening 104 which can secured an ultrasonic probe (or other imaging modality as described previously);
  a vertical slide bar 105 slideably engaged with the body 101 of the probe holder 100, allowing the body 101 to slide vertically along the vertical slide bar 105; and
  a horizontal slide bar 106 secured to the vertical slide bar 105, the horizontal slide bar 106 having a channel opening 107 through its center;
    wherein the needle stabilizer 110 is slideably engaged to the horizontal slide bar 106 and extends through the channel opening 107 and has the ability to change positions along a length of the horizontal slide bar 106;
b) securing an imaging modality device within the opening 104 of the probe holder 100;
c) placing the needle guide 110 on a patient;
d) activating the imaging modality device to visualize the virtual visualization bars 115, the needle guide 110, and needle stabilizer 140;

20 e) aligning the needle stabilizer 140 and the central tube 142 using the imaging modality to visualize the virtual visualization bars, the needle guide, and needle stabilizer;
f) adjusting the angle of the needle and needle stabilizer 140 using the angular ruler 112 based on information obtained from the imaging modality stated in (e);
g) inserting a needle into the needle stabilizer 140;
h) advancing the needle through the needle stabilizer 140;
i) verifying the location of the needle within the patient using imaging modalities stated in (e); and
j) repeating steps (e) through (i) until the needle is positioned in a desired location.

Any method described herein may incorporate any design element contained within this application and any other document/application incorporated by reference herein.

1. An imaging needle guide 10 comprising:
one or more grids 20, 30 including a body 21, 31, a top side 23, 33, a bottom side 24, 34, one or more radiopaque rings 29, 39, and a central aperture 22, 32 extending through the body 21, 31 from the top side 23, 33 to the bottom side 24, 34.

2. The imaging needle guide 10 of claim 1 wherein:
one grid is a proximal grid 20 including a body 21, a top side 23, a bottom side 24, one or more radiopaque rings 29, and a central aperture 22 extending through the body 21 from the top side 23 to the bottom side 24; and
another grid is distal grid 33 including a body 31, a top side 33, a bottom side 34, one or more radiopaque rings 39, and a central aperture 32 extending through the body 31 from the top side 33 to the bottom side 34.

3. The imaging needle guide 10 of claim 1 further comprising:
one or more direction markers 26, 36 located on the grid 20, 30 to aid the user in ascertaining the orientation of the grid.

4. The imaging needle guide 10 of claim 2 further comprising:
a central tube 62 engaged to the distal grid 20 at one end and slideably engaged to the proximal grid 30 at the opposite end, wherein the proximal grid 30 can slide along the central tube and become a needle guide 60.

5. The imaging needle guide 10 of claim 2 further comprising:
one or more arms 27 emanating from the body of the proximal grid 20, wherein a handle 95 or clamp are engaged with the arm 27 to aid in maintaining the location of the proximal grid 20 and aiming the proximal grid.

6. The imaging needle guide 10 of claim 1 further comprising:
an externally adjustable needle guide 60 operatively associated with the grid 20, 30, the externally adjustable needle guide including:
  a body 61 secured to the grid 20, 30;
  a ball bearing 70 with a central aperture 72;
  a central tube 62 secured to the ball bearing 70 and passing through the central aperture 72;
  wherein the ball bearing 70 allows the central tube 72 to be adjusted to a desired position to aid in directing the needle into a patient.

7. The imaging needle guide 10 of claim 1 further comprising:
an internally adjustable needle guide 50 operatively associated with a puncturing needle and the grid 20, 30, the internally adjustable needle guide including:
  a central tube 42 secured to the puncturing needle;

the central tube can be operationally engaged with the grid 20, 30 and secured to the grid and passing through the central aperture;

wherein the central tube is inserted into a patient at a desired position to aid in directing the needle into a patient.

8. A method of positioning a needle within a patient comprising the steps of;

a. providing an imaging needle guide 10 comprising:
a grid 20, 30 including a body 21, 31, a top side 23, 33, a bottom side 24, 34, one or more radiopaque rings 29, 39, and a central aperture 22, 32 extending through the body 21, 31 from the top side 23, 33 to the bottom side 24, 34; and
a needle;

b. placing the grid on a patient;

c. inserting the needle through the central aperture 22, 32 of the grid or through an internally 50 or externally 60 adjustable needle guide;

d. inserting the needle into or passing the needle through the central aperture 22, 32 of the grid;

e. aligning the grid and the needle or externally adjustable needle guide using radiography, ultrasound, or magnetic resonance to visualize the radiopaque ring and the needle guide of each grid;

f. advancing the needle through the central aperture of the grid with or without needle guide or through the externally adjustable needle guide and the grid;

g. verifying the location of the needle within the patient using imaging modalities stated in (e);

h. repeating steps e through g until the needle is positioned in a desired location.

9. A method of positioning a needle within a patient comprising the steps of;

a. providing an imaging needle guide 10 comprising:
a proximal grid 20 including a body 21, a top side 23, a bottom side 24, one or more radiopaque rings 29, and a central aperture 22 extending through the body from the top side to the bottom side;
a distal grid 30 including a body 31, a top side 33, a bottom side 34, one or more radiopaque rings 39, and a central aperture 32 extending through the body from the top side to the bottom side; and
a needle;

b. placing the distal grid 20 on a patient;

c. inserting the needle through the central aperture 22 of the proximal grid 20 or through a central tube engaged to the proximal grid at one end and slideably engaged to the distal grid at the opposite end, wherein the proximal grid can slide along the axle and become an internal needle guide;

d. inserting the needle into or passing the needle through the central aperture of the distal ring;

e. aligning the proximal grid and the distal grid using fluoroscopic radiography to visualize the radiopaque rings of each grid;

f. advancing the needle through the central aperture of the distal ring or through the hollow axle and the distal ring;

g. verifying the location of the needle within the patient using fluoroscopic radiography;

h. repeating steps e through g until the needle is positioned in a desired location.

10. The method of claim 9 further comprising:
one or more direction markers located on the proximal grid to aid the user in ascertaining the orientation of the proximal grid.

11. The method of claim 9 further comprising:
a proximal arm emanating from the body of the proximal grid, wherein a handle or clamp are engaged with the proximal arm to aid in maintaining the location of the proximal grid and aiming the proximal grid.

12. The method of claim 9 further comprising:
an externally adjustable needle guide operatively associated with the grid, the externally adjustable needle guide including:
a body secured to the distal grid;
a ball bearing with a central aperture;
a central tube secured to the ball bearing and passing through the central aperture;
wherein the ball bearing allows the central tube to be adjusted to a desired position to aid in directing the needle into a patient.

13. The method of claim 9 further comprising:
an internally adjustable needle guide operatively associated with the grid, the internally adjustable needle guide including:
a body secured to the grid;
a central tube secured to the body and passing through the central aperture;
wherein the central tube is inserted into a patient at a desired position to aid in directing the needle into a patient.

14. A horizontal grid 80 or grids comprising:
a body 81 with a top side 83, a bottom side 84 and an edge 85 around the perimeter of the body;
a plurality of needle paths 86 passing through the body of each horizontal grid; and one or more radiopaque grid lines 89 located on or within the body of each horizontal grid;
wherein when horizontal grids are paired, they are positioned such that the radiopaque grid lines of one horizontal grid are perpendicular to the radiopaque grid lines of the other horizontal grid.

15. The pair of horizontal grids of claim 14 wherein the shape is selected from the group including: round, oval, square, or any combination thereof.

16. The horizontal grid of claim 14 further comprising:
a medical imaging device; and
a needle;
wherein one or more persons to position the horizontal grid onto a patient and use the medical imaging device to align the (pair of) horizontal grid with the aid of the radiopaque grid lines and insert the needle into one of the needle paths to place the needle in a desired location in the patient.

17. The (pair of) horizontal grid of claim 16 wherein the medical imaging device is radiography, ultrasound, or magnetic resonance.

18. A needle guide 110 comprising:
a base 111 to which a pair of vertical slide bars 120 are secured;
the vertical slide bars including a channel opening 121 running through a body 122 of the vertical slide bar;
a horizontal slide bar 130 slideably engaged to the pair of vertical slide bars 120;
the horizontal slide bar including a base 131 and a channel opening 133 running through the base of the horizontal slide bar;
wherein the horizontal slide bars are slideably engaged to the channel opening of each vertical slide bar allowing the position of the horizontal slide bar to change along the length of the vertical slide bars;
a needle stabilizer is slideably engaged with the horizontal slide bar resting on the top of the base; and
a top plate 134 with a channel opening 135 is engaged to the base, securing the needle stabilizer to the base;
wherein the needle stabilizer extends through the channel opening and has the ability to change positions along the length of the horizontal slide bar;

19. The needle guide of claim 18 further comprising: one or more radiopaque lines to aid in visualization using radiography, ultrasound, or magnetic resonance (or any other medical imaging technology) to visualize the radiopaque line(s).

20. The needle guide of claim 18 wherein the needle is an externally adjustable needle guide.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:

1. A needle guide comprising: a base to which a pair of horizontal slide bars are secured, the horizontal slide bars including a channel opening running between the bars; a needle stabilizer with a central tube is slideably engaged with the pair of horizontal slide bars; wherein the needle stabilizer extends through the channel opening and has an ability to change positions along a length of the horizontal slide bar; and an angular ruler secured to the base and located proximal to the needle stabilizer to allow accurate adjustment of an angle of needle stabilizer a probe holder comprising a body with a pair of arms emanating down from the body; a door hingedly secured to one arm and able to swing and engage the other arm, creating an opening which can secured an ultrasonic probe; a vertical slide bar slideably engaged with the body of the probe holder, allowing the body to slide vertically along the vertical slide bar; and a horizontal slide bar secured to the vertical slide bar, the horizontal slide bar having a channel opening through its center; wherein the needle stabilizer is slideably engaged to the horizontal slide bar 106 and extends through the channel opening and has the ability to change positions along a length of the horizontal slide bar.

2. The needle guide of claim 1 further comprising: one or more radiopaque lines or virtual visualization bars to aid in visualization using radiography, ultrasound, or magnetic resonance to visualize the radiopaque lines or virtual visualization bars.

3. The needle guide of claim 1 wherein the needle guide is an externally adjustable needle guide.

4. The needle guide of claim 3 further comprising: an internal adjustable needle guide that is non-detachably associated with the externally adjustable needle guide; wherein the internal adjustable needle guide is inserted through a central passage of a ball bearing on the needle stabilizer and secured to the ball bearing or stabilizer through a locking mechanism.

5. The needle guide of claim 3 further comprising: an internal adjustable needle guide that is detachably associated with the externally adjustable needle guide; wherein the internal adjustable needle guide is inserted through the externally adjustable needle guide and can be locked in place through a luer lock, Tuohy Borst connection, or other locking mechanism.

6. The needle guide of claim 1, wherein the opening created by the door may be circular, rectangular, square, or any other shape to secure the ultrasonic probe.

7. The needle guide of claim 6 wherein the horizontal slide bar is a semi-circular track which allows the needle stabilizer to side along the semi-circular track.

8. A needle guide comprising: a base to which a pair of horizontal slide bars are secured, the horizontal slide bars including a channel opening running between the bars; a needle stabilizer with a central tube is slideably engaged with the pair of horizontal slide bars; wherein the needle stabilizer extends through the channel opening and has an ability to change positions along a length of the horizontal slide bar; an angular ruler secured to the base and located proximal to the needle stabilizer to allow accurate adjustment of an angle of the needle stabilizer; and one or more virtual visualization bars to aid in visualization using radiography, ultrasound, or magnetic resonance to visualize the virtual visualization bars; a probe holder comprising a body with a pair of arms emanating down from the body; a door hingedly secured to one arm and able to swing and engage the other arm, creating an opening which can secured an ultrasonic probe; a vertical slide bar slideably engaged with the body of the probe holder, allowing the body to slide vertically along the vertical slide bar; and a horizontal slide bar secured to the vertical slide bar, the horizontal slide bar having a channel opening through its center; wherein the needle stabilizer is slideably engaged to the horizontal slide bar and extends through the channel opening and has the ability to change positions along a length of the horizontal slide bar.

9. The needle guide of claim 8 wherein the needle guide is an externally adjustable needle guide.

10. The needle guide of claim 9 further comprising: an internal adjustable needle guide that is non-detachably associated with the externally adjustable needle guide; wherein the internal adjustable needle guide is inserted through a central passage of a ball bearing on the needle stabilizer and secured to the ball bearing or stabilizer through a locking mechanism.

11. The needle guide of claim 9 further comprising: an internal adjustable needle guide that is detachably associated with the externally adjustable needle guide; wherein the internal adjustable needle guide is inserted through the externally adjustable needle guide and can be locked in place through a luer lock, Tuohy Borst connection, or other locking mechanism.

12. The needle guide of claim 8, wherein the opening created by the door may be circular, rectangular, square, or any other shape to secure the ultrasonic probe.

13. The needle guide of claim 8, wherein the horizontal slide bar is a semi-circular track which allows the needle stabilizer to side along the semi-circular track.

* * * * *